(12) United States Patent
Moore et al.

(10) Patent No.: US 12,453,057 B2
(45) Date of Patent: Oct. 21, 2025

(54) THERMAL MANAGEMENT FOR HEAD MOUNTED WEARABLE DEVICE

(71) Applicant: Google LLC, Mountain View, CA (US)

(72) Inventors: Joshua Moore, Elora (CA); Emil Rahim, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/249,929

(22) PCT Filed: Aug. 19, 2022

(86) PCT No.: PCT/US2022/075211
§ 371 (c)(1),
(2) Date: Apr. 20, 2023

(87) PCT Pub. No.: WO2024/039405
PCT Pub. Date: Feb. 22, 2024

(65) Prior Publication Data
US 2024/0244798 A1    Jul. 18, 2024

(51) Int. Cl.
*H05K 7/20* (2006.01)
*G02B 27/01* (2006.01)
(Continued)

(52) U.S. Cl.
CPC ..... *H05K 7/20481* (2013.01); *G02B 27/0176* (2013.01); *G06F 1/163* (2013.01); *G06F 1/203* (2013.01); *G02B 2027/0178* (2013.01)

(58) Field of Classification Search
CPC .. G02B 27/0176; G02B 27/017; G02B 7/008; G02B 2027/0178; G06F 1/163;
(Continued)

(56) References Cited

U.S. PATENT DOCUMENTS 9,626,899 B2 *  4/2017  Yajima ................. G09G 3/3208
9,703,103 B2 *  7/2017  Araki .................. G02B 27/028
(Continued)

FOREIGN PATENT DOCUMENTS

CN    112666707 A    4/2021
CN    215494349 U    1/2022
(Continued)

OTHER PUBLICATIONS

Office Action for Taiwanese Application No. 112117674 (with English Translation), mailed May 20, 2024, 16 pages.
(Continued)

*Primary Examiner* — Michael A Matey
(74) *Attorney, Agent, or Firm* — Brake Hughes Bellermann LLP

(57) ABSTRACT

Systems and methods for thermal management in wearable computing devices are provided. Thermal management strategies included in the wearable computing device provide for dissipation of heat generated by electronic components installed within enclosures, or housings, of the wearable computing devices to maintain operability of the electronic components, maintain functionality and/or operability of the wearable computing device, and maintain user comfort while the wearable computing device is worn. The enclosure includes a multilayered stack of materials including a thermal layer embedded within insulating layers. The thermal layer may be shaped so as to direct the spreading of heat in a desired direction, to maintain surface touch temperatures within allowable ranges, and maintain internal enclosure temperatures within operating ranges of the electronic components.

22 Claims, 17 Drawing Sheets

(51) Int. Cl.
*G06F 1/16* (2006.01)
*G06F 1/20* (2006.01)

(58) Field of Classification Search
CPC .......... G06F 1/203; G06F 3/011; G06F 1/206;
G06F 1/1626; G06F 1/1643; G06F
1/1681; G06F 2200/1633; G06F 1/1684;
H05K 7/20963; H05K 7/2039; H05K
7/20; H05K 7/20127; H05K 7/20436;
H05K 7/20454; H05K 7/20509; H05K
1/0201; H05K 5/0213; H05K 5/069;
H05K 5/10; H05K 7/1427; H05K 7/2029;
H05K 7/20409; H05K 7/20418; H05K
7/20945; H05K 7/2099; H05K 9/0007;
H05K 7/20481; A61B 5/02438; F28F
21/00; F28F 2255/02; A41D 2400/82;
A45F 2005/008; A45F 5/00; B29L
2031/3481; F28D 15/00; F28D 15/02;
H04B 1/385
See application file for complete search history.

(56) References Cited

U.S. PATENT DOCUMENTS

| 9,918,407 | B2 | 3/2018 | Rosales et al. | |
|---|---|---|---|---|
| 10,747,026 | B1* | 8/2020 | Zhang | G02C 11/06 |
| 11,751,366 | B1* | 9/2023 | Young | A61K 39/145 |
| | | | | 361/705 |
| 12,032,171 | B1* | 7/2024 | Nikkhoo | G02C 5/22 |
| 2008/0151503 | A1* | 6/2008 | Aapro | H04M 1/026 |
| | | | | 361/714 |
| 2010/0009174 | A1 | 1/2010 | Reis et al. | |
| 2010/0142154 | A1 | 6/2010 | Collet et al. | |
| 2015/0138700 | A1* | 5/2015 | Goyal | G06F 1/163 |
| | | | | 264/272.11 |
| 2016/0070393 | A1* | 3/2016 | Sharma | A61B 5/7475 |
| | | | | 345/174 |
| 2016/0209659 | A1* | 7/2016 | Nikkhoo | G02C 5/18 |
| 2016/0212879 | A1* | 7/2016 | Nikkhoo | H05K 7/20127 |
| 2016/0212888 | A1 | 7/2016 | Nikkhoo et al. | |
| 2016/0255748 | A1* | 9/2016 | Kim | G02B 27/017 |
| | | | | 361/695 |
| 2016/0375609 | A1 | 12/2016 | Sander et al. | |
| 2016/0381832 | A1 | 12/2016 | Hurbi et al. | |
| 2017/0060177 | A1* | 3/2017 | Rahim | G02B 27/0176 |
| 2017/0064869 | A1* | 3/2017 | Siahaan | B23P 15/26 |
| 2017/0203479 | A1* | 7/2017 | Laurin | B32B 27/12 |
| 2017/0343293 | A1 | 11/2017 | Hurbi et al. | |
| 2018/0017798 | A1* | 1/2018 | Yoshida | H04N 9/3141 |
| 2018/0120892 | A1* | 5/2018 | von Badinski | A61B 5/6806 |
| 2018/0196485 | A1* | 7/2018 | Cheng | G06F 1/206 |
| 2018/0210216 | A1* | 7/2018 | Holland | H04N 9/3182 |
| 2018/0373035 | A1* | 12/2018 | Yee | G02B 6/005 |
| 2019/0082555 | A1* | 3/2019 | Hooton | H05K 9/0075 |
| 2019/0101960 | A1* | 4/2019 | Silvanto | G06F 1/181 |
| 2019/0198982 | A1* | 6/2019 | Moore | H01Q 1/273 |
| 2019/0198983 | A1* | 6/2019 | Moore | G02B 27/017 |
| 2019/0265487 | A1* | 8/2019 | Holland | G02B 27/0172 |
| 2020/0082790 | A1* | 3/2020 | Moore | G09G 5/10 |
| 2020/0162140 | A1* | 5/2020 | Tusi | H04N 23/54 |
| 2020/0174281 | A1* | 6/2020 | Gui | G02C 5/22 |
| 2020/0393685 | A1* | 12/2020 | Isaacs | G02B 27/0176 |
| 2021/0149206 | A1* | 5/2021 | Tiffin | G03B 30/00 |
| 2022/0256745 | A1* | 8/2022 | Yamada | G06F 1/1616 |
| 2023/0194891 | A1* | 6/2023 | Yang | G02C 5/18 |
| | | | | 351/114 |
| 2023/0309265 | A1* | 9/2023 | Nikkhoo | F28D 15/0208 |
| 2024/0165920 | A1* | 5/2024 | Oya | B32B 7/06 |
| 2024/0172381 | A1* | 5/2024 | Kim | C09D 175/16 |

FOREIGN PATENT DOCUMENTS

| EP | 3248035 | A1 | 11/2017 |
|---|---|---|---|
| EP | 3248035 | B1 | 1/2019 |
| EP | 3494595 | B1 | 8/2020 |
| JP | 2015143812 | A | 8/2015 |
| JP | 2017063322 | A | 3/2017 |
| TW | 201824477 | A | 7/2018 |

OTHER PUBLICATIONS

International Search Report and Written Opinion for PCT Application No. PCT/US2022/075211, mailed on Mar. 28, 2023, 15 pages.
Matsuhashi, et al., "Thermal Model and Countermeasures for Future Smart Glasses", Sensors 2020, 20, 1446, doi:10.3390/s20051146, www.mdpi.com/journal/sensors, Mar. 6, 2020, 20 pages.
Communication under Rule 71(3) EPC for European Application No. 22768585.6, mailed Mar. 21, 2025, 49 pages.
Office Action for Japanese Application No. 2023-540573 (with English translation), mailed Mar. 18, 2025, 13 pages.
Office Action for Korean Application No. 10-2023-7017302 (with English translation), mailed Mar. 4, 2025, 22 pages.

* cited by examiner

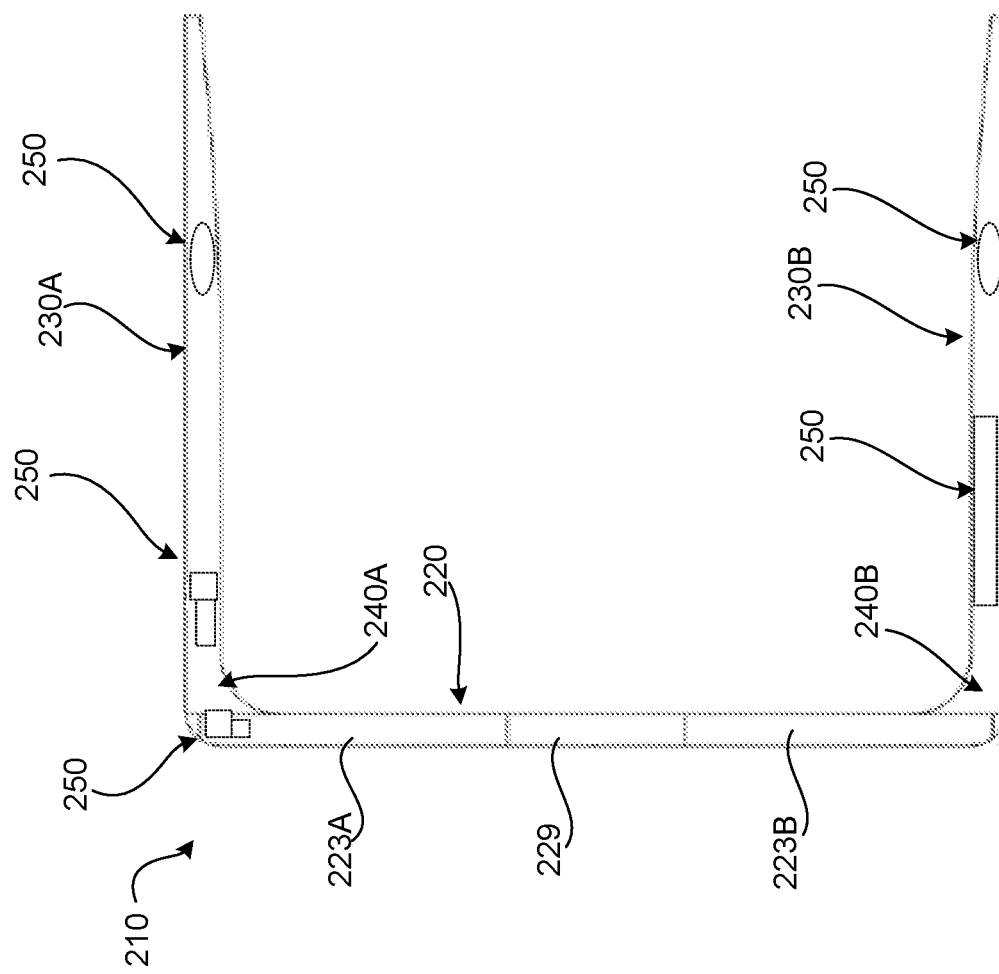

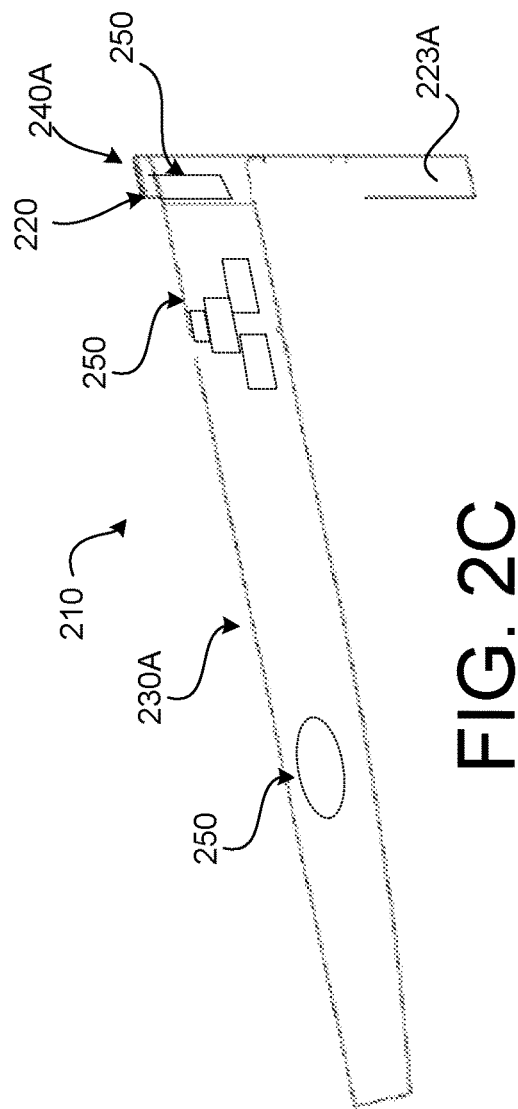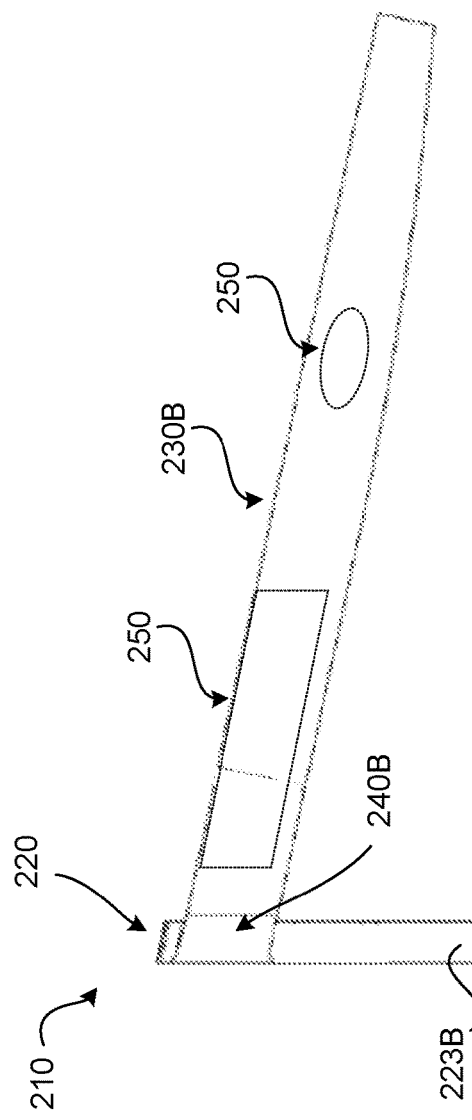

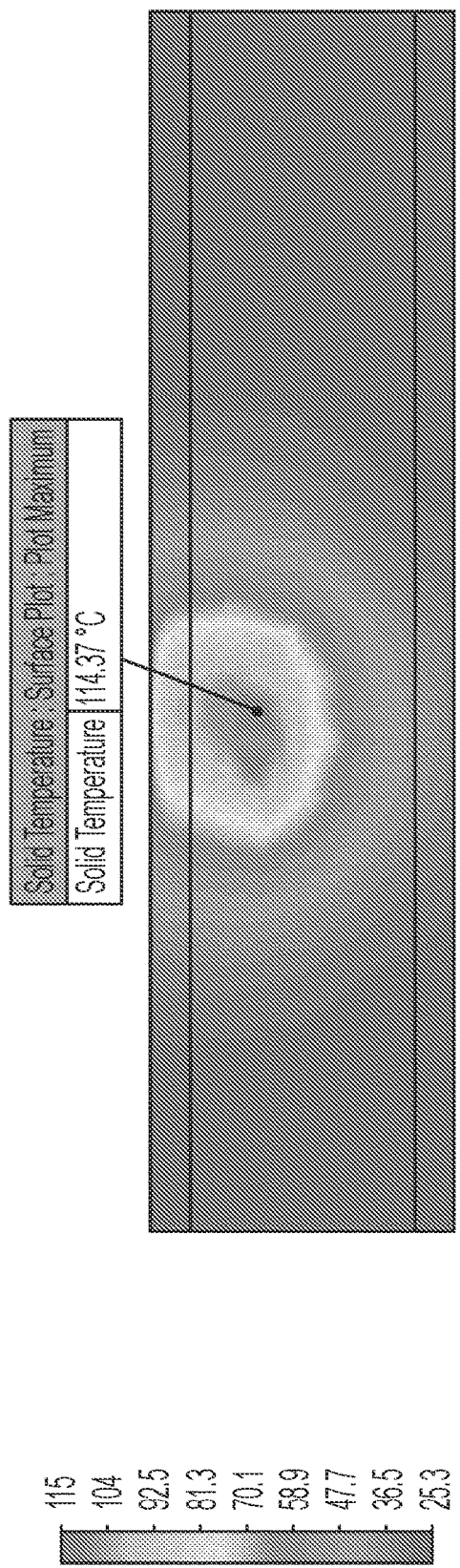
FIG. 4A(1)
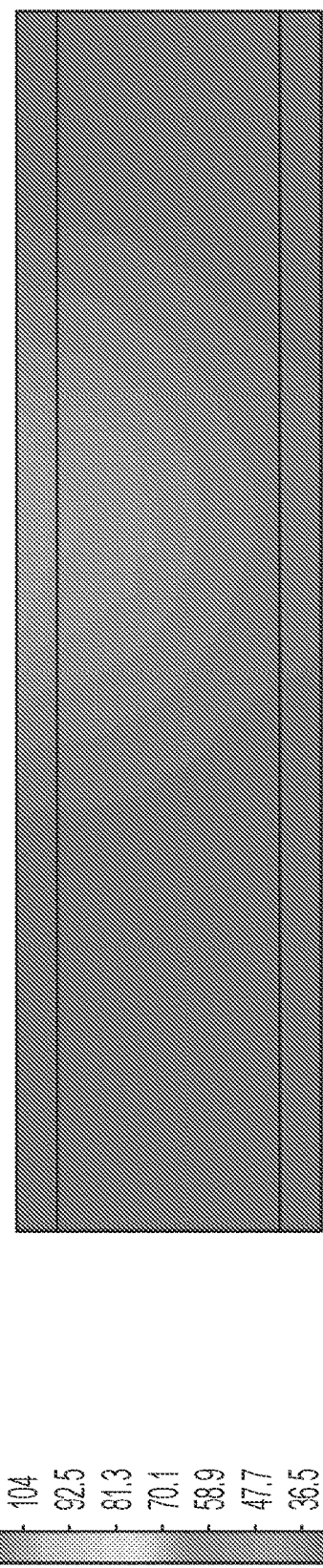
FIG. 4A(2)

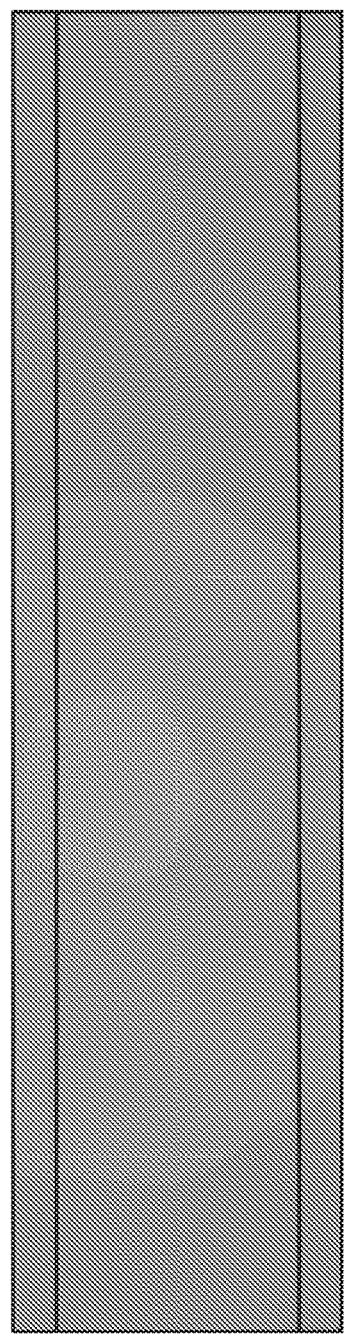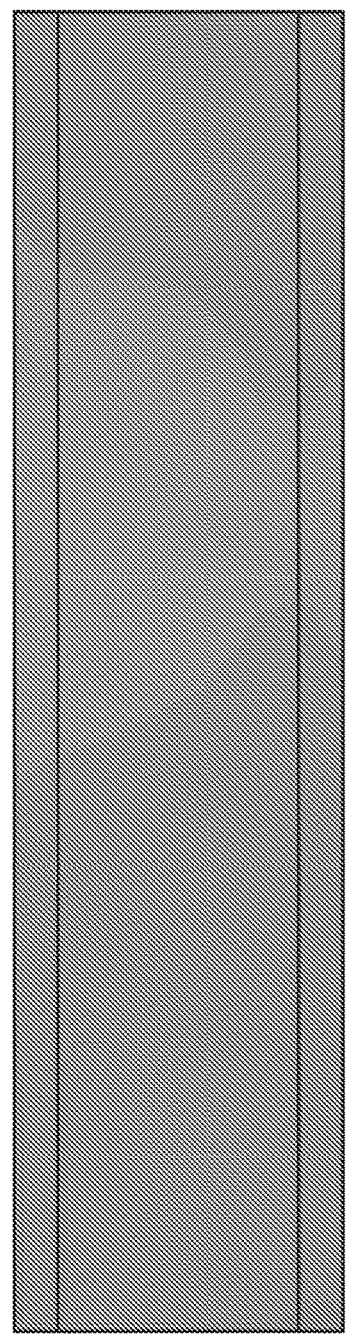
FIG. 4B(1)
FIG. 4B(2)

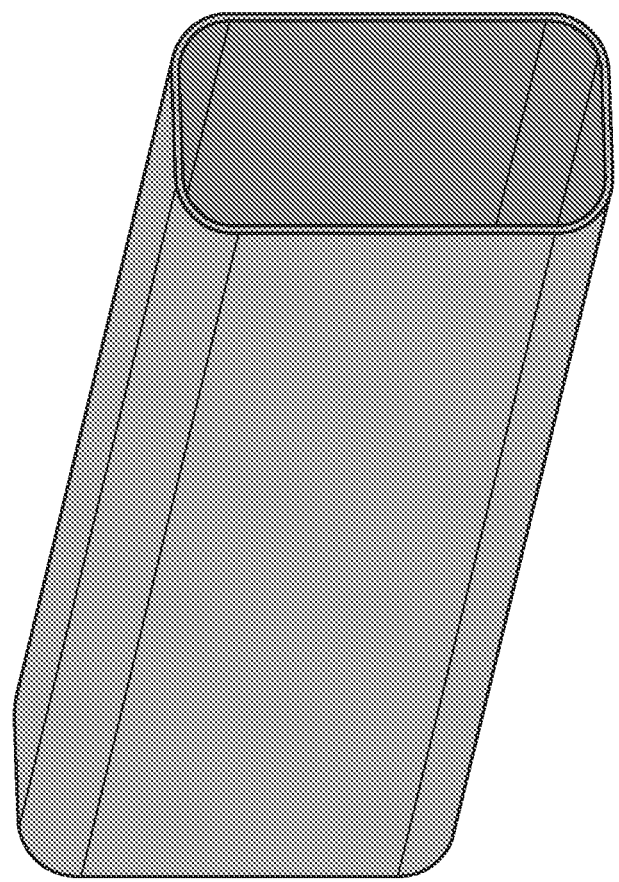
FIG. 4B(3)

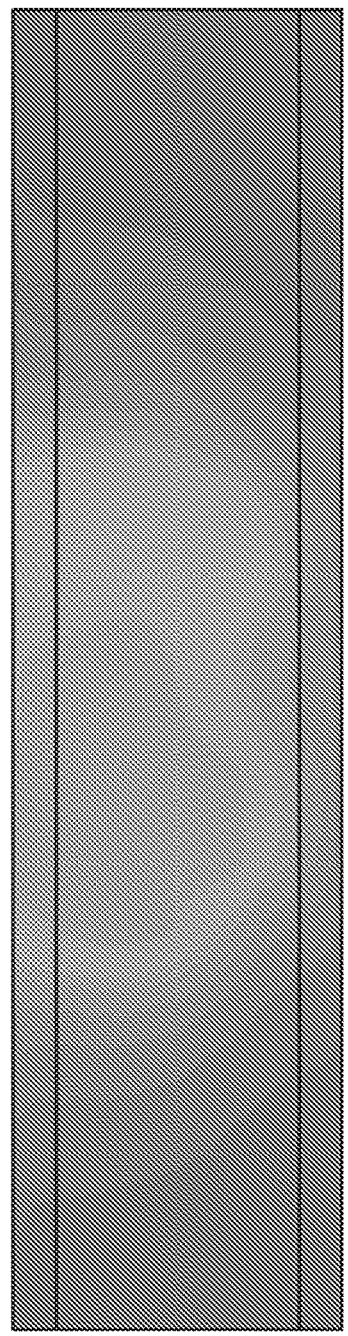
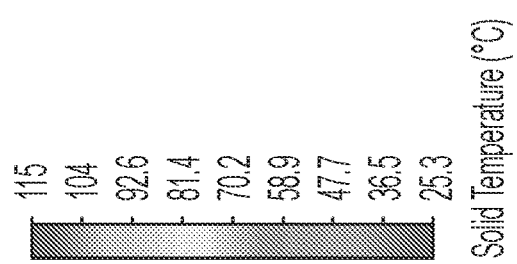
FIG. 4C(1)
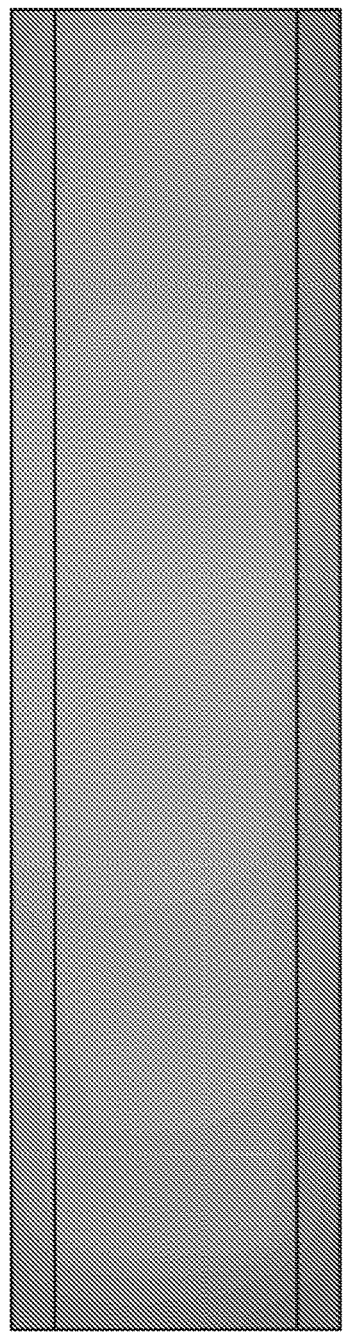
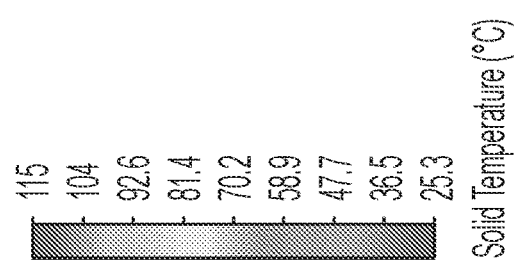
FIG. 4C(2)

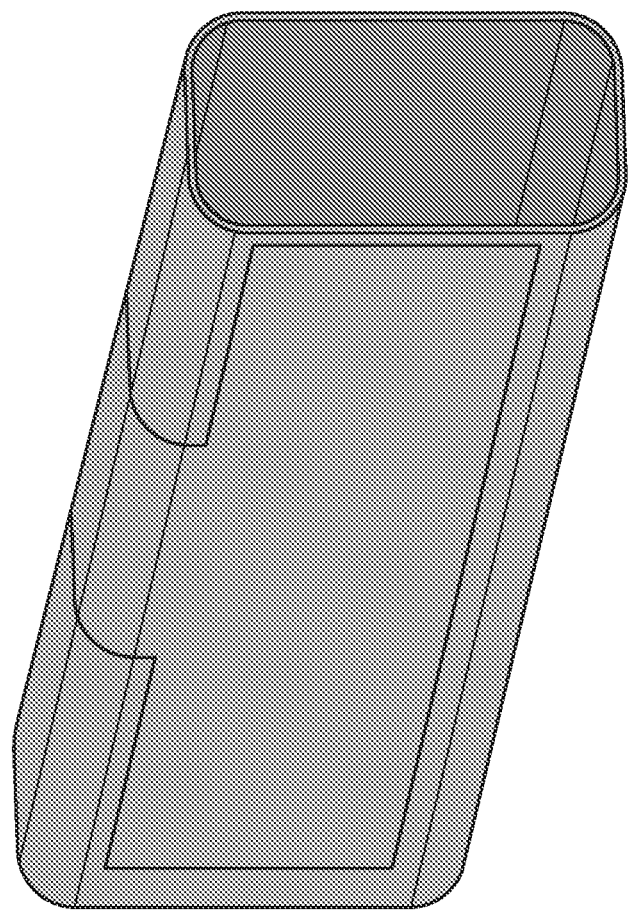
FIG. 4C(3)

THERMAL MANAGEMENT FOR HEAD MOUNTED WEARABLE DEVICE

CROSS-REFERENCE TO RELATED APPLICATION

This application is a 35 U.S.C. § 371 National Phase Entry Application from PCT/US2022/075211, filed on Aug. 19, 2022, entitled "THERMAL MANAGEMENT FOR HEAD MOUNTED WEARABLE DEVICE", the disclosure of which is incorporated herein by reference in its entirety.

TECHNICAL FIELD

This description relates in general to thermal management in wearable devices, and in particular, to thermal management in head mounted wearable computing devices including electronic components.

BACKGROUND

Wearable computing devices may include, for example head mounted wearable devices, wrist worn wearable devices, hand worn wearable devices pendants, and the like. Head mounted wearable devices may include, for example, smart glasses, headsets, goggles, ear buds, and the like. Wrist/hand worn wearable devices may include, for example, smart watches, smart bracelets, smart rings, and the like. Wearable computing devices may include various types of electronic components that provide for functionality of the wearable computing device. These electronic components may generate heat during operation, which may degrade operation of the components, impact functionality of the wearable computing device, produce user discomfort and the like if the heat is not effectively dissipated. Volume available within a housing of the wearable computing device for the installation of these electronic components may be somewhat constrained due to the form factor of the wearable computing device, the necessary arrangement of the electronic components within the constrained installation volume to provide the desired functionality, and other such factors. Accordingly, this type of installation environment may not easily accommodate traditional systems and methods for dissipation of heat. Housings, or enclosures, that can provide for thermal management in the form factors associated with these types of wearable computing devices may maintain the functionality of the electronic components, and the wearable computing device, as well as user comfort.

SUMMARY

A system and method, in accordance with implementations described herein, may incorporate thermal management strategies into wearable computing devices that provide for effective heat dissipation and spreading, while also preserving an interior volume for the installation of electronic components and retaining the desired overall form factor of the wearable computing device. In some general aspects, thin walled enclosures defining the interior volume and the external form factor may incorporate a shaped or contoured intermediate layer embedded within inner and outer layers. The intermediate layer may have relatively higher thermal conductivity properties than the inner and outer layers, such that the intermediate layer defines a thermal path for the spreading and/or dissipation of heat generated by the electronic components installed within the thin walled enclosure. Manufacturing techniques such as, for example, thermoforming, compression molding, additive manufacturing and the like may provide for the manufacture of such thin walled enclosures, while preserving the interior installation volume and also the desired external form factor of the wearable computing device.

The details of one or more implementations are set forth in the accompanying drawings and the description below. Other features will be apparent from the description and drawings, and from the claims.

BRIEF DESCRIPTION OF THE DRAWINGS

FIG. 2B is a top view of the example frame of the example head mounted wearable device.

FIG. 2C is a first side view, and FIG. 2D is a second side view, of the example frame of the example head mounted wearable device.

FIGS. 4A-4C are surface temperature plots illustrating surface temperature of example enclosures during operation of example heat generating components.

DETAILED DESCRIPTION

This disclosure relates to systems and methods providing for thermal management in wearable computing devices. Systems and methods, in accordance with implementations described herein, provide for the incorporation, or integration, of thermal management systems into the enclosures, or housings, of wearable computing devices. Systems and methods, in accordance with implementations described herein, provide for dissipation of heat generated by electronic components installed within the enclosures, or housings, of wearable computing devices to maintain operability of the electronic components, maintain functionality and/or operability of the wearable computing device, and maintain user comfort while the wearable computing device is worn.

Figure 1A:
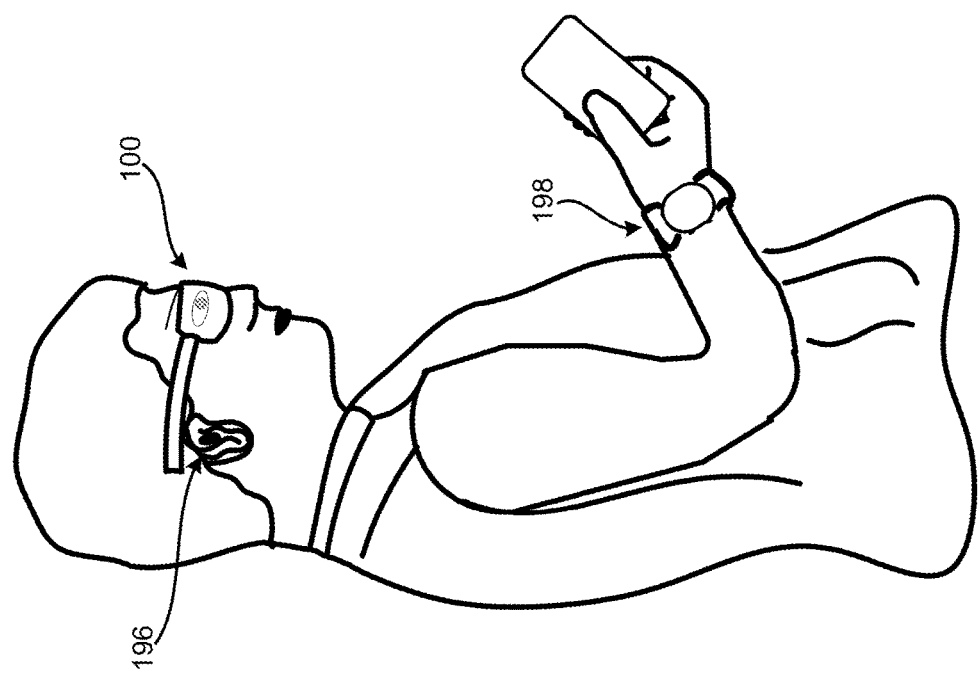
FIG. 1A illustrates example wearable devices worn by a user.

FIG. 1A illustrates a user wearing a number of different wearable devices, including an example head mounted wearable device 100 in the form of smart glasses, or augmented reality glasses, including display capability and computing/processing capability. The example wearable devices shown in FIG. 1A also include another example head mounted wearable device 196 in the form of ear buds, and an example wrist worn wearable device 198 in the form of a smart watch. Hereinafter, systems and methods will be described with respect to a wearable computing device in the form of a head mounted wearable computing device, or smart glasses, or augmented reality glasses, simply for purposes of discussion and illustration. The principles to be described herein may be applied to other types of wearable computing devices.

Figure 1B:
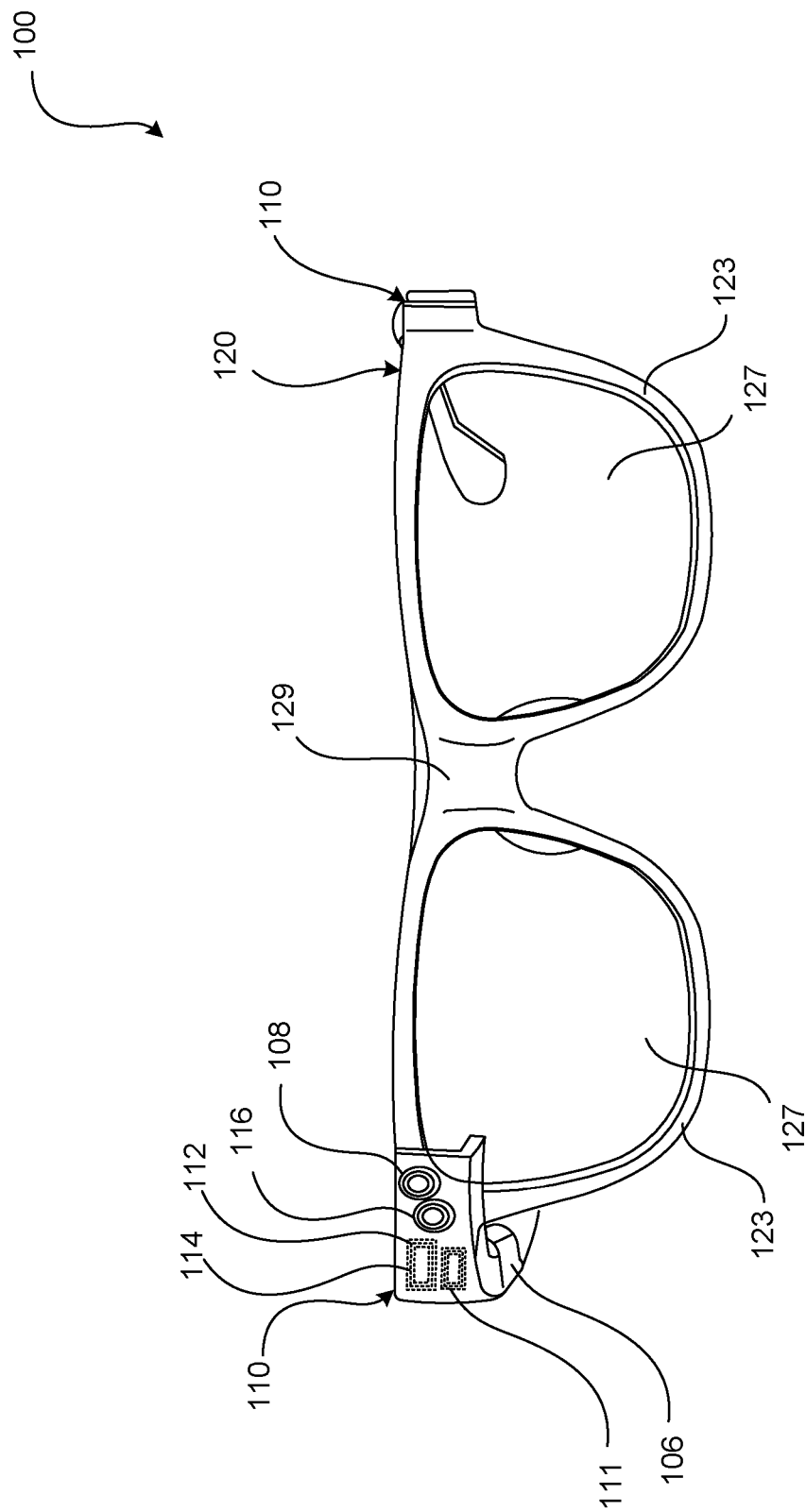
FIG. 1B is a front view.
Figure 1C:
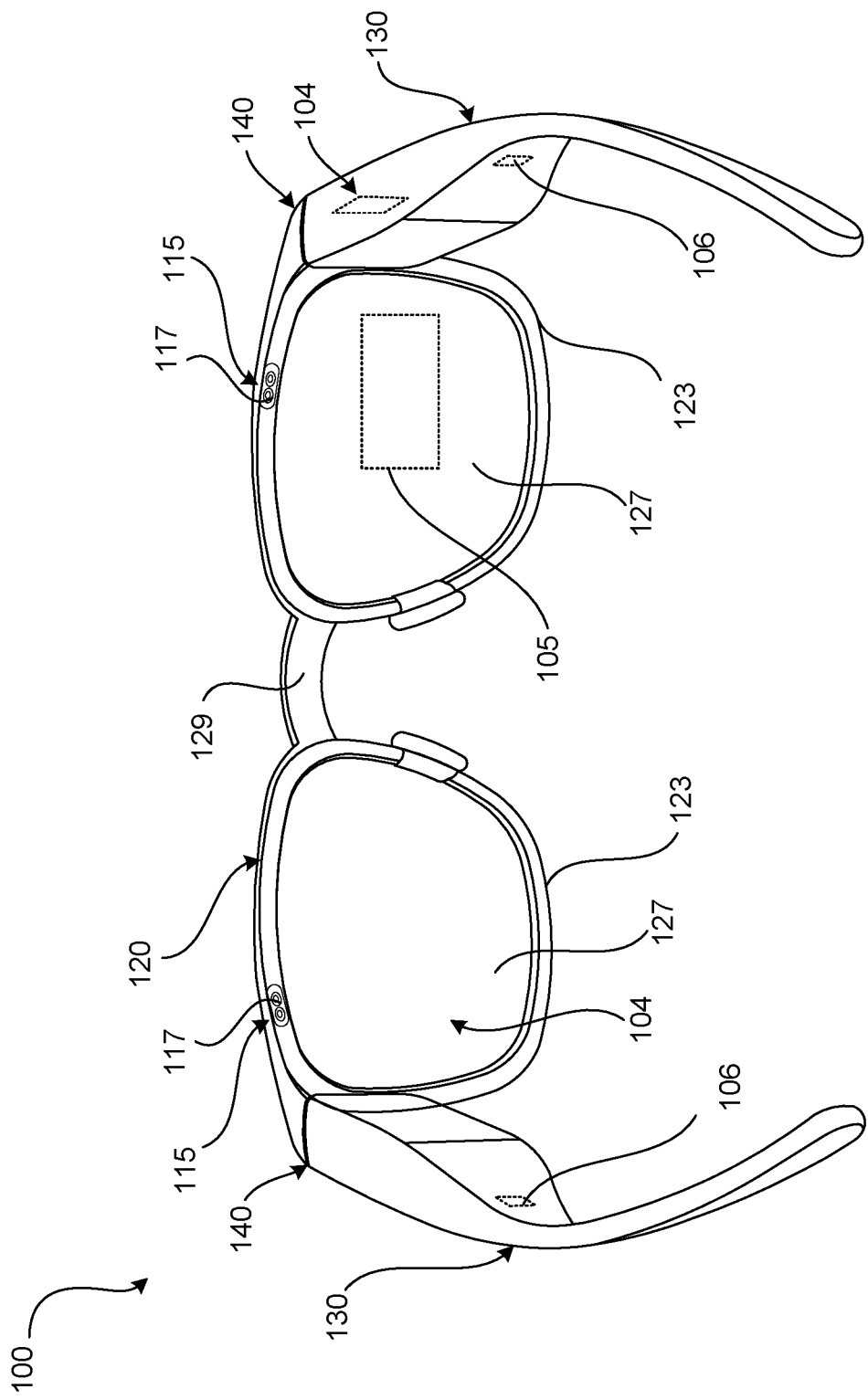
FIG. 1C is a rear view of the example head mounted wearable device shown in FIG. 1A.
Figure 1D:
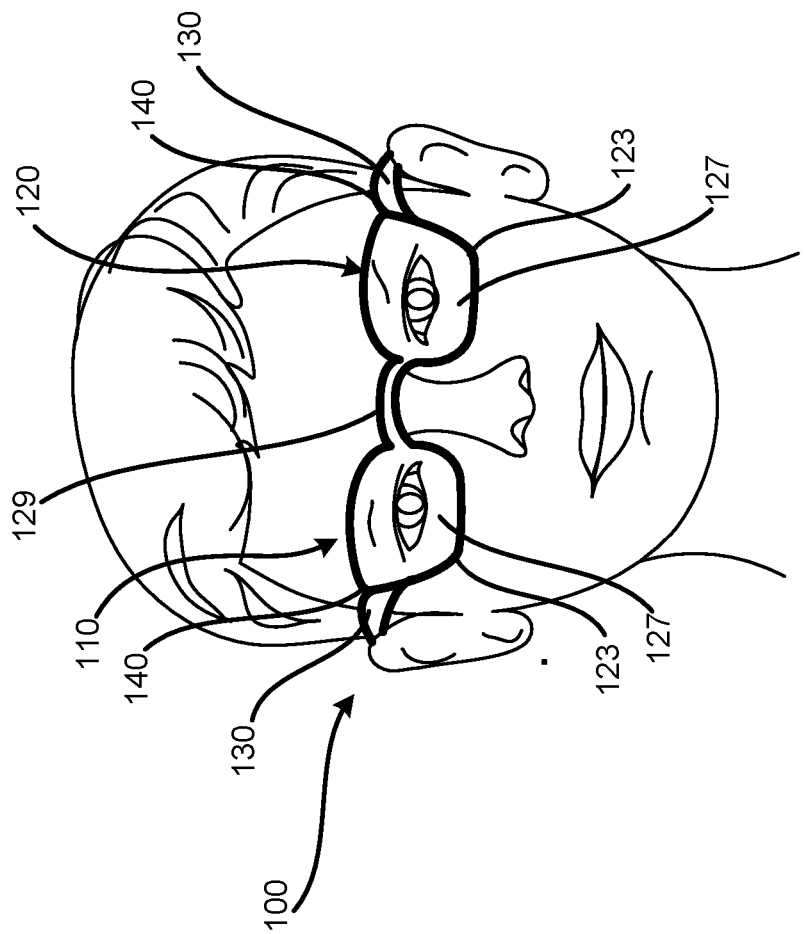
FIG. 1D is a front view of the head mounted wearable device shown in FIGS. 1B and 1C, worn by the user.

FIG. 1B is a front view, and FIG. 1C is a rear view; of the example head mounted wearable device 100 shown in FIG. 1A. FIG. 1D is a front view of the example head mounted wearable device 100 worn by the user. The example head mounted wearable device 100 includes a frame 110. The frame 110 includes a front frame portion 120, and a pair of temple arm portions 130 rotatably coupled to the front frame portion by respective hinge portions 140. The front frame portion 120 includes rim portions 123 surrounding respective optical portions in the form of lenses 127, with a bridge portion 129 connecting the rim portions 123. The arm portions 130 are coupled, for example, pivotably or rotatably coupled, to the front frame portion 120 at the hinge portion 140 of the respective rim portion 123. In some examples, the lenses 127 are corrective/prescription lenses. In some examples, the lenses 127 are an optical material including glass and/or plastic portions that do not necessarily incorporate corrective/prescription parameters.

In some examples, the wearable device 100 includes a display device 104 that can output visual content, for example, at an output coupler 105, so that the visual content is visible to the user. In some examples, the display device 104 is provided in a portion of the frame 110. In the example shown in FIGS. 1B and 1C, the display device 104 is provided in one of the two arm portions 130, simply for purposes of discussion and illustration. Display devices 104 may be provided in each of the two arm portions 130 to provide for binocular output of content.

In some examples, the display device 104 may be a see through near eye display. In some examples, the display device 104 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 127, next to content (for example, digital images, user interface elements, virtual content, and the like) output by the display device 104. In some implementations, waveguide optics may be used to depict content on the display device 104.

In some examples, the head mounted wearable device includes one or more of an audio output device 106 (such as, for example, one or more speakers), an illumination device 108, a sensing system 111, a control system 112, at least one processor 114, and an outward facing image sensor 116, or camera 116. In some examples, the head mounted wearable device 100 may include a gaze tracking device 115 including, for example, one or more sensors 117, to detect and track eye gaze direction and movement. Data captured by the gaze tracking device 115 may be processed to detect and track gaze direction and movement as a user input. In some examples, the sensing system 111 may include various sensing devices and the control system 112 may include various control system devices including, for example, one or more processors 114 operably coupled to the components of the control system 112. In some examples, the control system 112 may include a communication module providing for communication and exchange of information between the wearable computing device 100 and other external devices.

In some examples, some, or all, of the electronic components described above with respect to the example head mounted wearable device 100 are received within respective enclosures, or housings, defined by the front frame portion 120 and/or the temple arm portions 130 of the frame 110. Numerous factors may affect the placement and/or installation of these types of electronic components in the respective enclosures, or housings, defined by the front frame portion 120 and/or the temple arm portions 130. One of these factors may include, for example, size and/or configuration of the electronic component relative to the installation volume available within the respective enclosure, or housing. Another of these factors may include an installation position for the electronic component that is associated with the functionality of that particular component. This may include, for example, positioning of the audio output device 106 such that audio signals output by the audio output device 106 are directed to the user's ear, positioning of the image sensor 116 for capture of image data of the physical environment within the field of view of the image sensor 116, and other such factors.

Due to considerations such as form factor, internal configuration, and the like associated with the frame 110 of the head mounted wearable device 100, alone or together with the installation factors described above, it is difficult to incorporate typical thermal management/heat dissipation strategies into the head mounted wearable device 100. For example, in an installation environment that is less constrained by form factor, available internal installation volume and the like, elements such as heat sinks, fans, thermal gels, heat pipes, metal heat dissipation structures and the like may be implemented to maintain installation temperatures at or below set temperature threshold limits. Lack of these types of thermal management/heat dissipation elements may make it difficult to maintain the installed components at or below maximum threshold operating temperatures. This may result in thermal throttling of the operation of the electronic components and the corresponding experiences provided by the head mounted wearable device 100. Lack of these types of thermal management/heat dissipation elements and continued operation of the electronic components may result in localized hot spots at external portions/surfaces of the frame 110 that exceed desired touch temperature thresholds. This may result in discomfort to the user, particularly in areas at or in close proximity to the head of the user. This may adversely impact the wearability of the head mounted wearable device for an appreciable amount of time, thus degrading functionality and/or utility.

Thus, without effective thermal management, heat generated due to the operation of the electronic components received within the enclosures, or housings, defined by the front frame portion 120 and/or the arm portions 130 may degrade the operability/functionality of the electronic components and/or the operability/functionality of the head mounted wearable device 100. A system and method, in accordance with implementations described herein, provides a solution to the problem of incorporation of thermal management systems into such enclosures, or housings, having a somewhat limited form factor, to preserve the operability and/or functionality of the electronic components and/or the wearable device in which the electronic components are installed, and to preserve the comfort of the user during use of the head mounted wearable device. Systems and methods, in accordance with implementations described herein, provide for one or more thermal management devices incorporated and/or integrated into one or more housings, or enclosures, defined by a front frame portion and/or temple arm portions of a head mounted wearable device. In some examples, the head mounted wearable device is in the form of a pair of smart glasses, or augmented reality glasses. Systems and methods, in accordance with implementations described herein, may leverage material processing techniques to fabricate consumer product housings or enclosures that exhibit non-homogenous thermal properties. In some examples, thermal mitigation devices are distributed along surfaces of the housings or enclosures to facilitate thermal dissipation of heat generated by electronic components installed within the enclosure, or housing, to the environment. Use of materials/material processing to produce housings or enclosures having such non-homogeneous thermal properties may allow for the optimization of thermal dissipation to the environment while allowing electronic components having dynamic heat output/dissipation requirements to operate as necessary for the output of a particular experience.

Figure 2A:
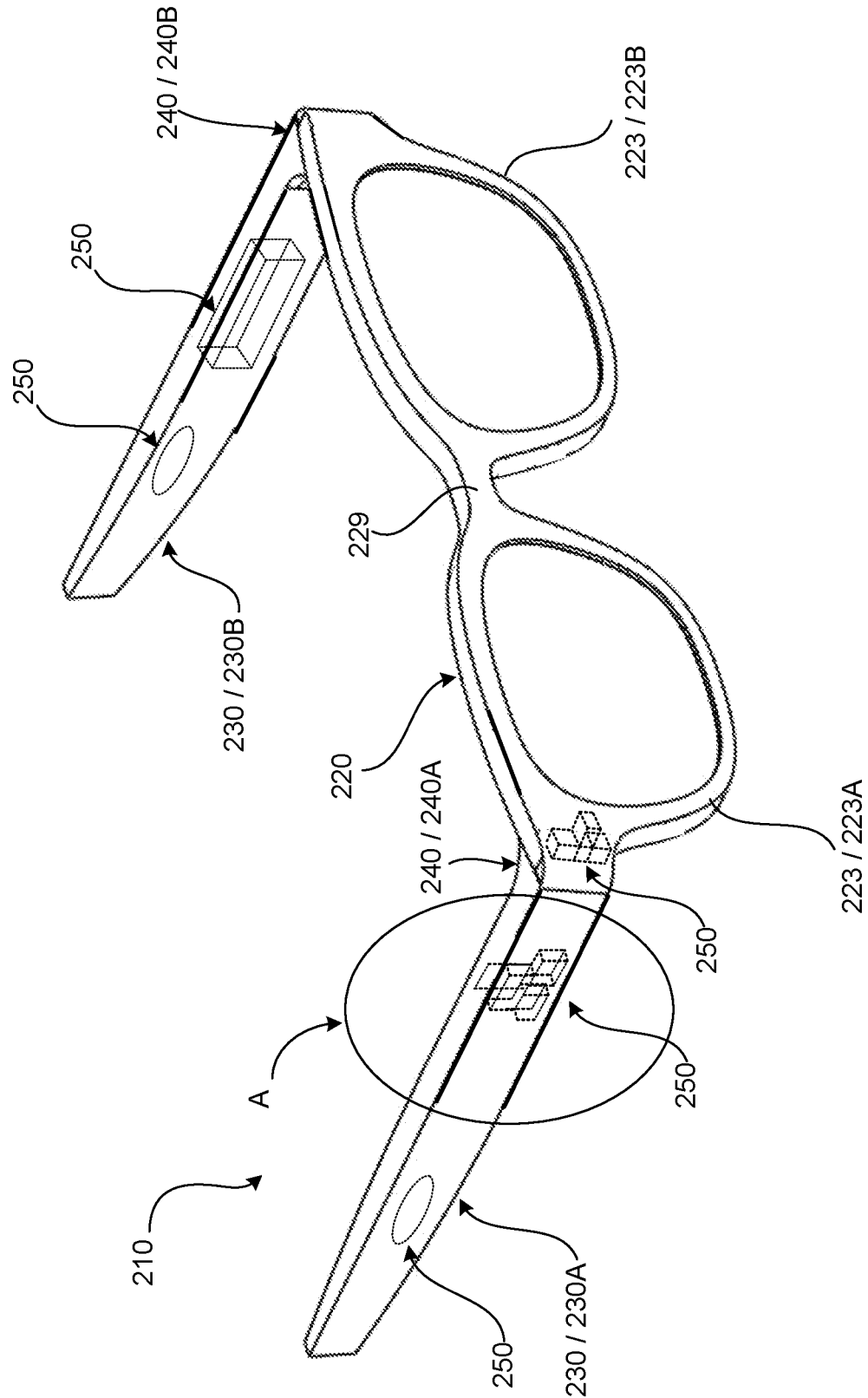
FIG. 2A is a perspective view of an example frame of an example head mounted wearable device.

FIG. 2A is a perspective view of an example frame 210 for a head mounted wearable device. The frame 210 may be used with the example head mounted wearable device 100 shown in FIGS. 1A-1D, or other head mounted wearable device. FIG. 2B is a top view; FIG. 2C is a first side view, and FIG. 2D is a second side view; of the example frame 210. The example frame 210 shown in FIGS. 2A-2D includes a front frame portion 220 coupled to arm portions 230 (i.e., a first arm portion 230A and a second arm portion 230B) at respective rim portions 223 (i.e., a first rim portion 223A and a second rim portion 223B) by hinge portions 240) (i.e., a first hinge portion 240A and a second hinge portion 240B) of the front frame portion 220. In particular, the first arm portion 230A is coupled to the first rim portion 223A at the first hinge portion 240A. The second arm portion 230B is coupled to the second rim portion 223B of the front frame portion 220 at the second hinge portion 240B. In some examples, a bridge portion 229 extends between the first rim portion 223A and the second rim portion 223B. The front frame portion 220 may define a housing, or an enclosure, having one or more interior spaces in which electronic components of the head mounted wearable device may be received. One, or both, of the of the first arm portion 230A and/or the second arm portion 230B may define a housing, or an enclosure, having one or more interior spaces in which electronic components of the head mounted wearable device may be received. Accordingly, at least some portions of the front frame portion 220 and/or one or both of the temple arm portions 230 may be at least partially hollow to define one or more interior spaces therein in which electronic components may be received.

The example frame 210 shown in FIGS. 2A-2D includes one or more example components 250 received in an interior portion of the first arm portion 230A of the frame 210. One or more example components 250 are received in an interior portion of the front frame portion 220, and in particular, in an interior portion of the first rim portion 223A, proximate the first hinge portion 240A. One or more example components 250 are received in an interior portion of the second arm portion 230B. The example components 250 may be, for example, electronic components of the example head mounted wearable device 100 described above, and/or other types of components that selectively generate heat while operating in the interior installation volume defined within the example frame 210. The example components 250 are shown merely for purposes of discussion and illustration. More, or fewer components and/or combinations of components, arranged similarly or differently than shown, may be installed in/received in the interior spaces defined within the example frame 210. The principles to be described herein can be applied to other electronic components and/or combinations of components, arranged in other interior spaces defined within other interior portions of the example frame 210. Similarly, the principles to be described herein may be applied to thermal management and heat dissipation in other types of wearable devices.

As described above, operation of the various example components 250 may generate heat in concentrated areas within the respective enclosures defined by the front frame portion 220 and/or the arm portions 230. Without thermal management measures in place, heat generated by operation of one or more of the components 250 can cause localized hotspots, particularly within the form factor of the frame 210) and the associated constrained installation volume. In some situations, continued operation of the components installed within the frame 210) may generate enough heat to create localized hot spots that cause user discomfort and/or that exceed allowable touch temperature thresholds. These localized hotspots may also affect the operation of one or more of the components 250 and/or overall operation of the head mounted wearable device 100. For example, operation temperatures of one or more of the components at or above a corresponding operational temperature threshold may necessitate throttling of the operation of the one or more components, and corresponding throttling of one or more functional features of the head mounted wearable device 100. A system and method, in accordance with implementations described herein, may address the issue of hot spots generated due to the operation of one or more of the components 250 by moving and/or spreading heat generated by the one or more components in a lateral direction within the respective enclosure, to maintain operation of the one or more of the components 250. This may include spreading the heat laterally within the material of the respective enclosure, while insulating the heat from translating outward one or more of the outer surfaces of the respective enclosure. This may maintain internal temperatures in the respective enclosures within set operating ranges, while also reducing or substantially eliminating hot spots at the outer surfaces of the frame 210 that would otherwise exceed temperature thresholds for user comfort in the wearing of the head mounted wearable device 100. In some examples, the spreading of heat in this manner allows the hot spot to flatten over time, providing for substantially uniform heat dissipation over time.

Figure 3A:
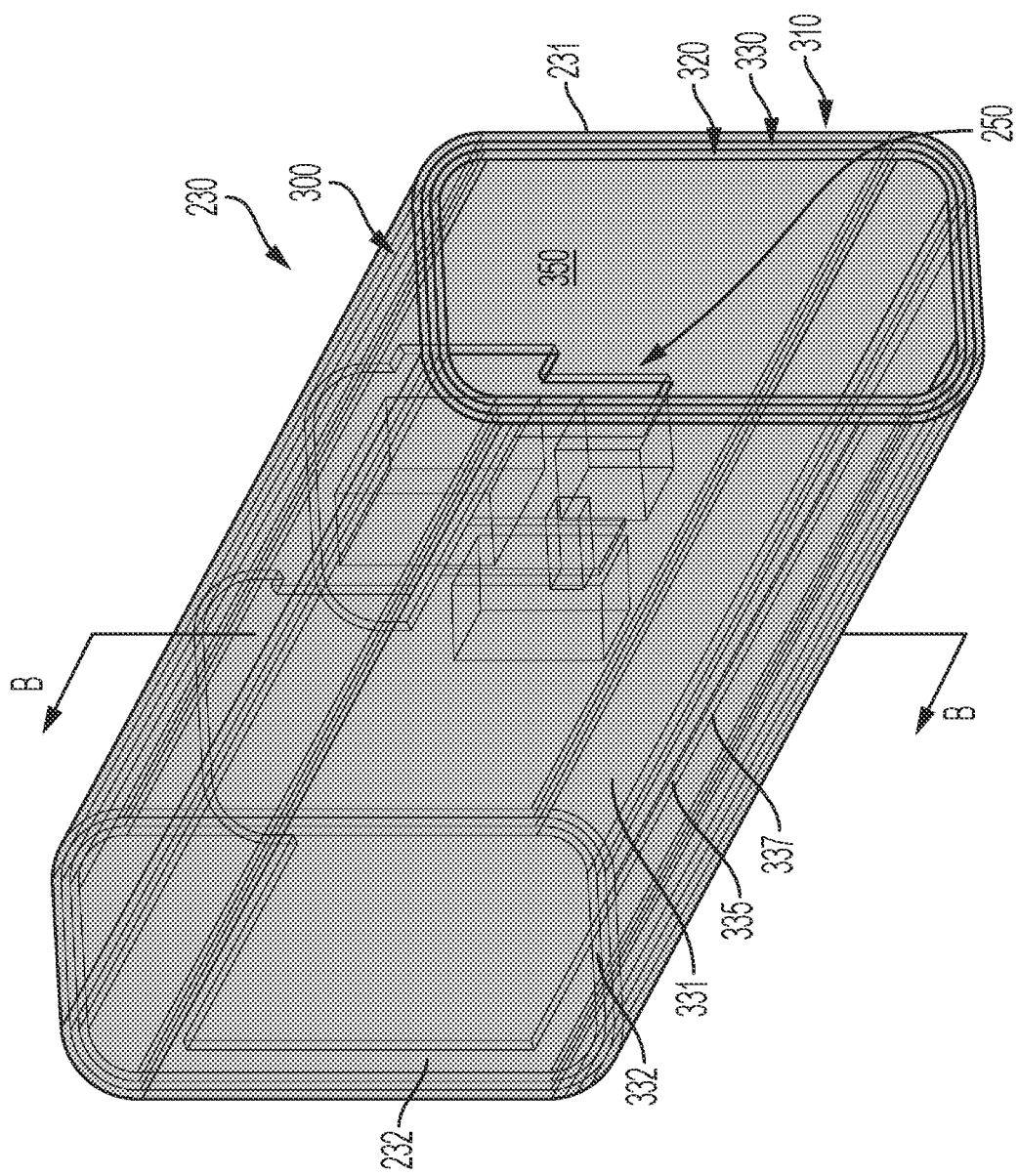
FIG. 3A is a perspective view of a section A shown in FIG. 2A of an example arm portion of the example frame shown in FIGS. 2A-2D.

FIG. 3A is a close in, semi-transparent view of an example section of one of the arm portions 230 of the example frame 210 shown in FIGS. 2A-2D. In particular, FIG. 3A is a close in, semi-transparent view, of the section A shown in FIG. 2A of the arm portion 230A of the example frame 210. FIG. 2B is a cross-sectional view taken along line B-B of FIG. 3A. FIG. 3C is a semi-transparent view of the front frame portion 220 of the example frame 210 shown in FIGS. 2A-2D. FIG. 3D is a cross-sectional view taken along line D-D of FIG. 3C. FIG. 3E schematically illustrates an example layup of materials forming one of the example enclosures shown in FIGS. 3A-3D. FIGS. 3A-3D illustrate the installation of example components 250) within an interior installation volume defined within the arm portion 230 of the example frame 210, and within the front frame portion 220 of the example frame 210, simply for purposes of discussion and illustration. Principles to be described herein can be applied to other components and/or other portions of the example frame 210.

Figure 3B:
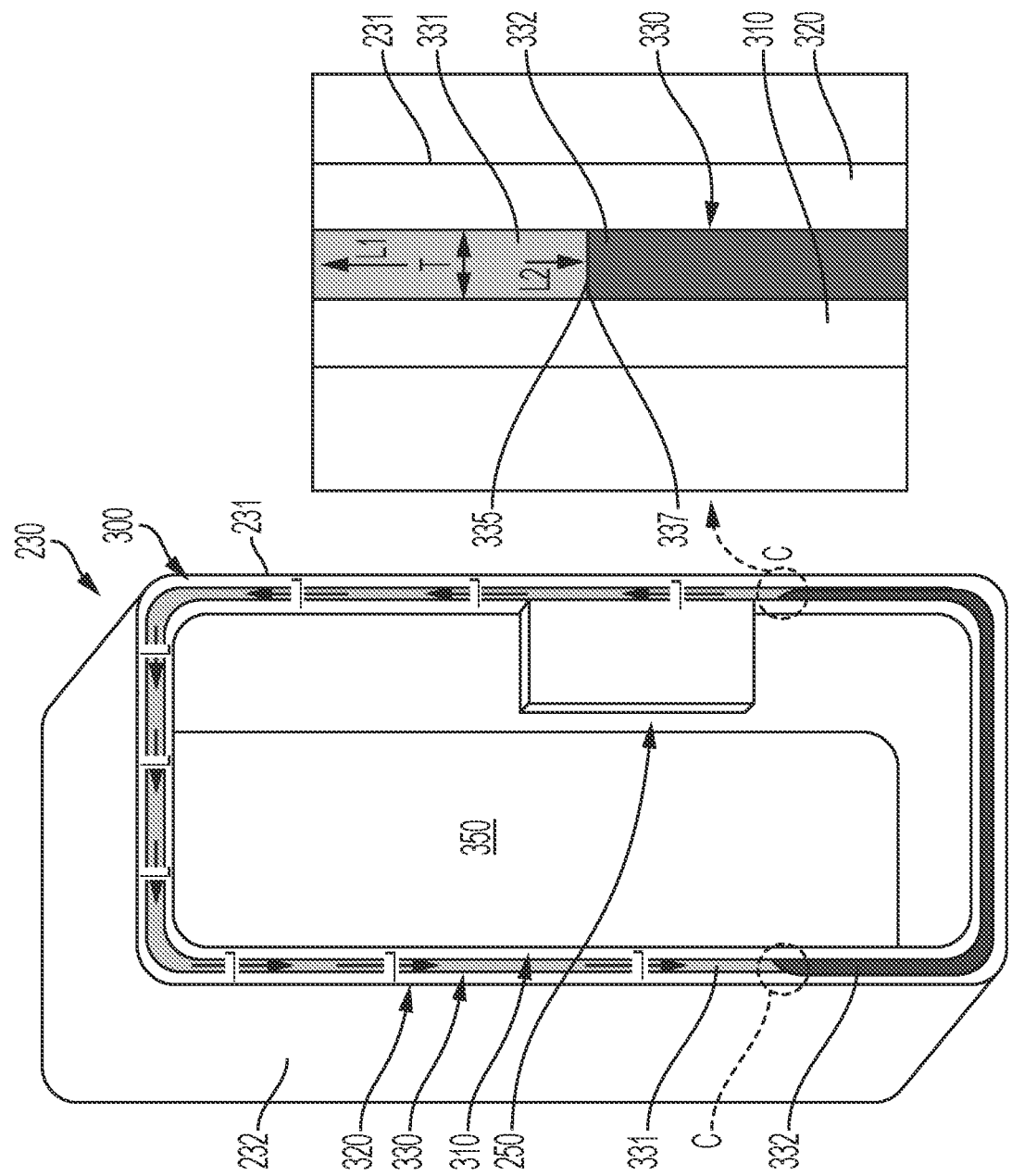
FIG. 3B is a cross-sectional view taken along line B-B of FIG. 3A.
Figure 3C:
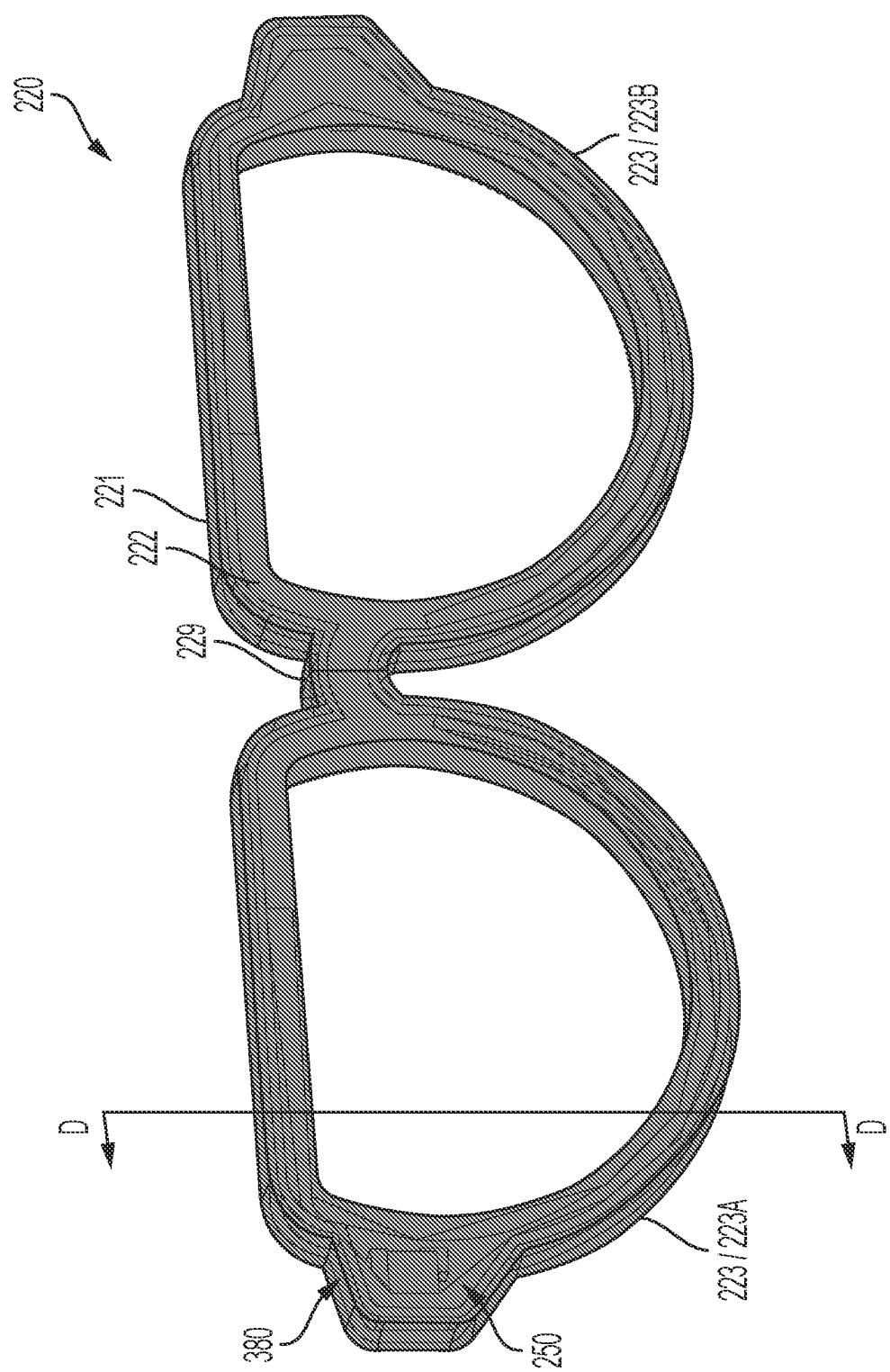
FIG. 3C is a perspective view of an example front frame portion of the example frame shown in FIGS. 2A-2D.
Figure 3D:
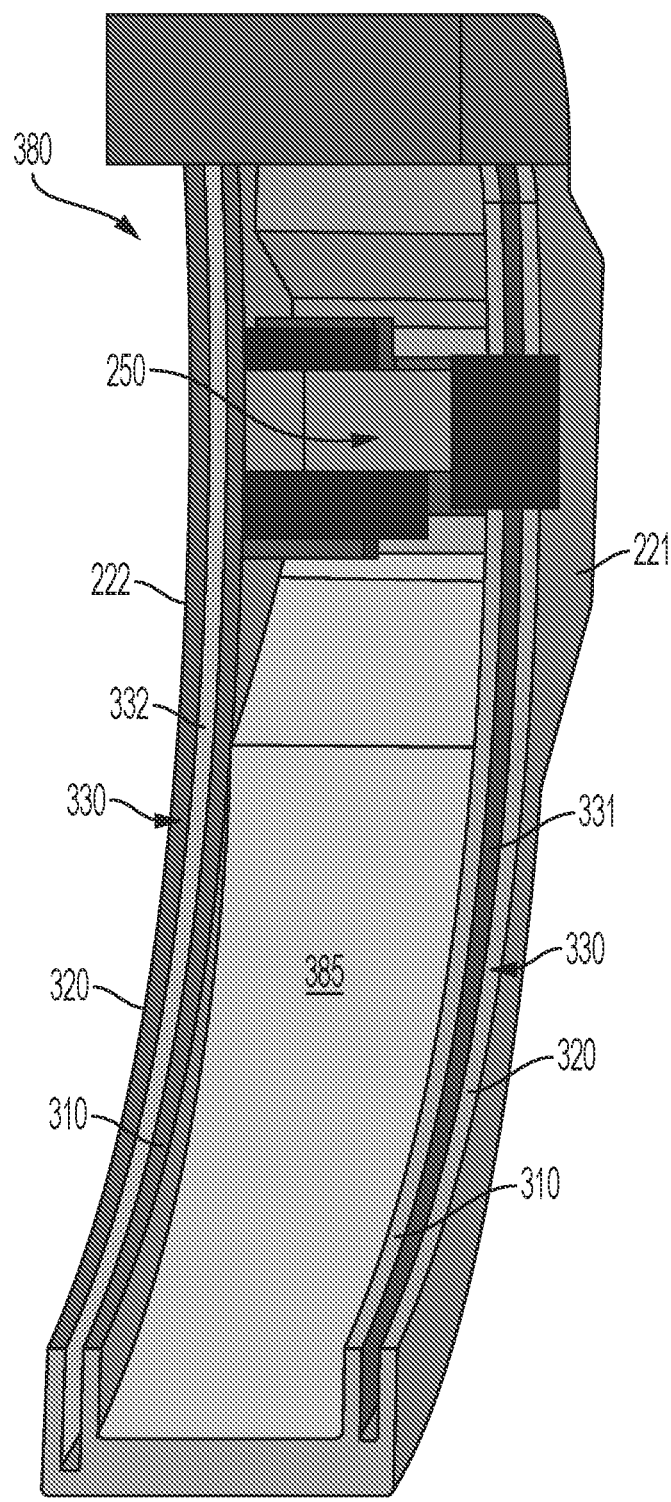
FIG. 3D is a cross-sectional view taken along line D-D of FIG. 3C.
Figure 3E:
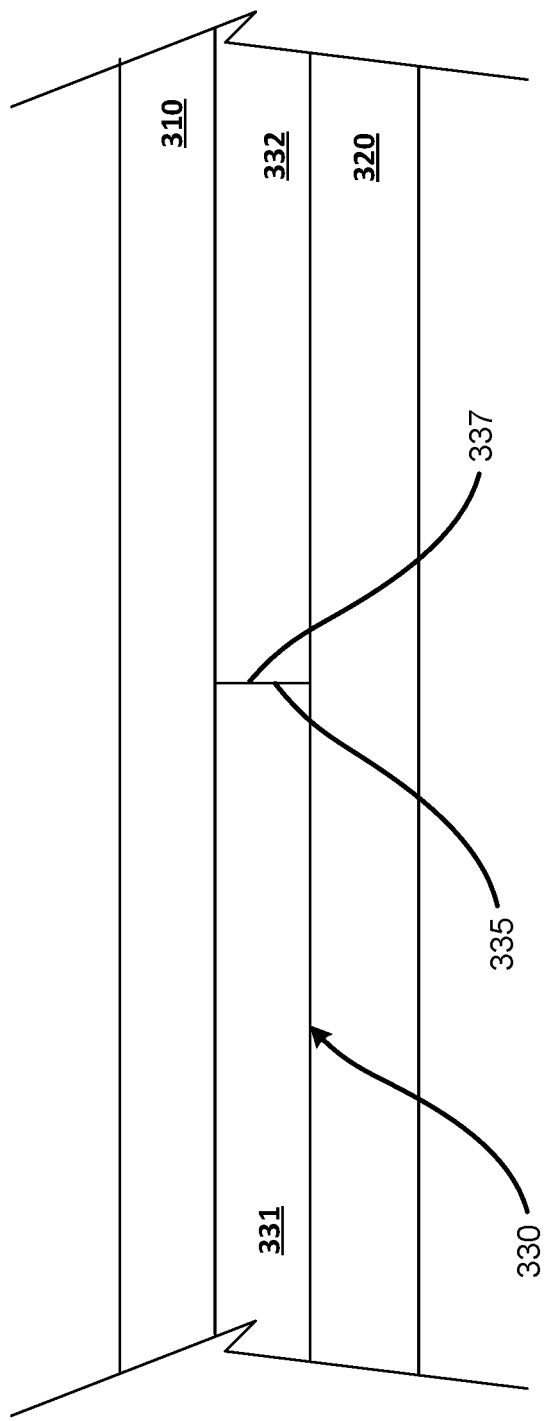
FIG. 3E is a schematic illustration of an example layup of materials forming example enclosures shown in FIGS. 3A-3D.

The section of the arm portion 230 shown in FIGS. 3A and 3B is oriented such that a first side 231 (i.e., a user facing side) of the arm portion 230 faces the head of the user, and a second side 232 (i.e., a world facing side) of the arm portion 230 faces the physical environment, when the head mounted wearable device 100 is worn by the user. As shown in FIGS. 3A and 3B, the structure of the arm portion 230 forms a housing 300, or an enclosure 300, defining an interior space 350), or an interior volume 350. The structure of the enclosure 300 defined by the arm portion 230 includes a material formed by an intermediate layer 330 positioned between a first (inner) layer 310 and a second (outer) layer 320. In the example arrangement shown in FIGS. 3A and 3B, the example components 250 are installed in the interior space 350, at a position corresponding to the first side 231 of the arm portion 230 of the frame 210.

In some examples, the enclosure 300 defined by the structure of the arm portion 230 may be a composite or additive material enclosure having thermal management elements integrated into, or incorporated into, or embedded into the structure. In some examples, the thermal management elements are configured to allow for the spreading and/or dissipation of heat to be customized for a particular installation of components at a particular location within the respective enclosure. In some examples, the first layer 310 may define an inner surface of the enclosure 300, and the second layer 320 may define an outer surface of the enclosure 300. In some examples, the first layer 310 may be made of a material having relatively low thermal conductivity properties, for example, a relatively low coefficient of thermal conductivity, such as, for example, a polycarbonate based material, a plastic based material, a resin based material, an epoxy based material, and other such materials. In some examples, the second layer 320 may be made of a material having relatively low thermal conductivity properties, for example, a relatively low coefficient of thermal conductivity, such as, for example, a polycarbonate based material, a plastic based material, a resin based material, an epoxy based material, and other such materials. In some examples, the intermediate layer 330 may include a material having relatively high thermal conductivity properties, such as, for example, a relatively high coefficient of thermal conductivity. For example, the intermediate layer 330 may include a material having relatively high thermal conductivity properties compared to the thermal conductivity properties of the first layer 310 and/or the second layer 320. In some examples, the first layer 310 and/or the second layer 320 may define insulating layers on opposite sides of the intermediate layer 330.

In some examples, the intermediate layer 330 may be configured to provide for varying levels of thermal conductivity. For example, the intermediate layer 330 can include multiple sections. In some examples, the multiple sections can be made of different materials having different thermal conductivity properties, or different coefficients of thermal conductivity. In some examples, the multiple sections can have different shapes and/or sizes and/or configurations to provide different thermal conductivity properties. In some examples, the multiple sections can be arranged, based on their respective thermal conductivity properties, to direct heat in a desired direction.

In the example shown in FIGS. 3A and 3B, the intermediate layer 330 includes a first section 331 and a second section 332. In the example arrangement shown in FIGS. 3A and 3B, a coefficient of thermal conductivity of the material of the first section 331 of the intermediate layer 330 may be relatively high, such as a material having thermal properties that provides for the spreading of heat generated by one or more of the components 250. A material having thermal properties configured to spread heat may be a material the thermal conductivity of which is greater than the thermal conductivity of at least one adjacent/adjoining material. In particular, the thermal conductivity may be larger than the thermal conductivity of each adjacent/adjoining material. In this example arrangement, the coefficient of thermal conductivity of the second section 332 may be relatively low. In some examples, the second section 332 may be formed of a material having thermal properties that provide for little to no conductivity so as to inhibit further spreading of heat. A material having thermal properties configured to inhibit further spreading heat may be a material the thermal conductivity of which is smaller than the thermal conductivity of at least one adjacent/adjoining material. In particular, the thermal conductivity may be smaller than the thermal conductivity of each adjacent/adjoining material. Thus, the first section of the intermediate layer 330 may be considered a thermal layer, or a thermally conductive layer, and the second section 332 of the intermediate layer 330 may be considered a non-thermal layer, or an insulating layer. In some examples, the second section may be formed of a material that is similar to, or substantially the same as, one or both of the first layer 310 and/or the second layer 320. In some examples, the material of the second section 332 of the intermediate layer 330 may exhibit insulating properties, such that heat from the first section 331 is not propagated into and through the second section 332 of the intermediate layer 330.

In some examples, the first section 331 may be configured to provide for the spreading or dissipation of heat in a desired manner, including, for example, a desired direction relative to the one or more components 250, at a desired rate, and the like. For example, the shape of the first section 331 may cause heat generated by the one or more components 250) to be drawn in a desired direction, toward a desired portion of the enclosure 300. The shape of the first section 331, and an interface between a peripheral portion of the first section 331 and a corresponding peripheral portion of the second section 332 may inhibit the further spreading or dissipation of heat from the first section 331 into the second section 332, due to the thermal conductivity properties of the second section 332. Thus, the boundaries of the first section 331 abutting the corresponding peripheral second section 332 may maintaining any remaining heat in the portion of the enclosure 300 corresponding to the first section 331 of the intermediate layer 330. In some examples, a rate of spreading, or dissipation, of heat along the first section 331 of the intermediate layer 330 may be based on, for example, the thermal conductivity of the material of the first section 331 of the intermediate layer 330. For example, various different materials having various different thermal conductivity properties may be used in the intermediate layer 330 to provide de varying levels of thermal conductivity.

FIG. 3B illustrates the lateral spreading, or dissipation of heat generated by the one or more components 250 along the first section 331 of the intermediate layer 330 in the direction of the arrows L. Further spreading, or dissipation, of heat, is inhibited at the boundaries of the first section 331 and the second section 332 (see, for example, the areas C shown in FIG. 3B), where the peripheral portions of the first section 331 abut corresponding peripheral portions of the section 332. As shown in the inset portion of FIG. 3B, heat generated by the one or more components 250 is drawn away from the one or more components, and spread, or dissipated, in the direction L1 by the first section 331 of the intermediate layer 330. Further spreading from the first section 331 into the second section 332 in the direction L2 is inhibited due to the relatively low thermal conductivity properties of the material of the second section 332 compared to that of the first section 331 of the intermediate layer 330. Similarly, translational spreading, or dissipation of heat in the direction of the arrow T, from the first section 331 of the intermediate layer 330 into the first layer 310 and/or the second layer 320 is inhibited due to the relatively low thermal conductivity properties of the materials of the first and/or second layers 310, 320 compared to that of the first section 331 of the intermediate layer 330.

The lateral spreading of heat (in the direction of the arrow L1 in FIG. 3B) generated by the one or more components 250 allows the heat to be spread, and dissipated, by the intermediate layer 330, and substantially maintained in the intermediate layer 330, based on the relatively high thermal conductivity properties of the material of the intermediate layer 330 compared to that of the first layer 310 and/or the second layer 320. That is, the relatively high thermal conductivity properties of the intermediate layer 330 compared to that of the first layer 310 and/or the second layer 320 inhibits translational heat spreading (in the direction of the arrow T in FIG. 3B). This may maintain the heat substantially in the intermediate layer 330, and maintain the outer surface of the second layer 320 (defining an outer surface of the arm portion 230 of the example frame 210 shown in FIGS. 3A and 3B) at or below threshold touch temperatures, thus preserving user comfort in the use of the head mounted wearable device 100. This may also inhibit heat from entering the interior space 350 through the first layer 310, thus maintaining the interior space 350 within the enclosure 300 at or below threshold operating temperatures for the one or more components 250 installed in the interior space 350.

In the example shown in FIG. 3B, the one or more components 250 at least partially contact the first section 331 of the intermediate layer 330. That is, in the example arrangement shown in FIG. 3B, a portion of the first layer 310 is cut away so that the one or more components 250) can at least partially contact the first section 331 of the intermediate layer 330. In some examples, the one or more components 250 may be installed on the first layer 310, with the material of the first section 331 of the intermediate layer 330 interposed between the one or more components 250) and the first section 331 of the intermediate layer 330. When arranged in this manner, heat from a hot spot generated at the portion of the inner layer 310 corresponding to the one or more components 250 may be transferred into the corresponding portion of the first section 331 of the intermediate layer 330 and spread laterally, in the direction of the arrow L1 as described above.

In some examples, a configuration of the intermediate layer 330 may direct the spreading, or dissipation of heat in a desired direction, to a desired area or portion of the enclosure 300, and the like. For example, a shape, or a peripheral contour 335, of the first section 331, abutting a corresponding peripheral portion 337 of the second section 332 of the intermediate layer 330, may direct the spreading, or dissipation, of heat generated by the one or more components 250 in a desired direction, toward a desired portion of the enclosure 300, corresponding to the peripheral contour 335 of the first section 331 of the intermediate layer 330. As noted above, the heat may spread, or dissipate, through the first section 331, and may be inhibited from spreading or dissipating into the second section 332 based on the relative thermal properties of the first and second sections 331, 332 of the intermediate layer 330. Thus, the spreading and/or dissipation of heat may be controlled, at least in part, by the shape and/or contour of the first section 331 relative to the second section 332 of the intermediate layer 330 of the structure forming the enclosure 300.

A similar approach may be taken in providing for the spreading, or dissipation, of heat in the front frame portion 220 of the example frame 210. The front frame portion 220 illustrated in FIGS. 3C and 3D is oriented such that a first side 221 (i.e., a user facing side) of the front frame portion 220 faces the head of the user, and a second side 222 (i.e., a world facing side) of the front frame portion 220 faces the physical environment, when the head mounted wearable device 100 is worn by the user. The structure of the front frame portion 220 forms a housing 380, or an enclosure 380, defining an interior space 385, or an interior volume 385. In the example shown in FIGS. 3C and 3D, the one or more components 250 are installed in a portion of the front frame portion 220 proximate the hinge portion 240, simply for purposes of discussion and illustration.

The structure of the enclosure 380 defined by the front frame portion 220 may include a layup of materials similar to what is described above with respect to the arm portion 230 shown in FIGS. 3A and 3B. That is, the material may include an intermediate layer 330 positioned between a first (inner) layer 310 and a second (outer) layer 320. The materials of the front frame portions 220 may be the same as/similar to, or different from, the materials of the arm portion 230. As described above, the structure of the front frame portion 220 may include a composite or additive material enclosure having thermal management elements integrated into, or incorporated into, or embedded into the structure, allowing the spreading and/or dissipation of heat to be customized for a particular installation of components at a particular location within the enclosure 380. In some examples, the first layer 310 may define an inner surface of the enclosure 380, and the second layer 320 may define an outer surface of the enclosure 380. The intermediate layer 330 may include a material having relatively high thermal conductivity properties, particularly compared to the thermal conductivity properties of the first layer 310 and/or the second layer 320. In some examples, the first layer 310 and/or the second layer 320 may define insulating layers on opposite sides of the intermediate layer 330 of the enclosure 380.

The structure of the intermediate layer 330 shown in FIGS. 3C and 3D may be conceptually similar to what is described above with respect to FIGS. 3A and 3B, including the first section 331 made of a material having relatively high thermal conductivity properties to provide for the spreading, or dissipation of heat generated by the one or more components 250, and the second section 332 having relatively lower thermal conductivity properties (i.e., providing little to no thermal conductivity), such that heat from the first section 331 is not propagated into and through the second section 332 of the intermediate layer 330.

As described above, the first section 331 may be configured to provide for the spreading or dissipation of heat in a desired manner, including, for example, a desired direction relative to the one or more components 250, at a desired rate, and the like. This may allow the system to maintain a temperature in the interior space 385 at or below threshold operating temperatures of the one or more components, and a touch temperature at the outer surface of the front frame portion 220 at or below touch temperature thresholds. For example, the shape of the first section 331 may cause heat generated by the one or more components 250 to be drawn in a desired direction, toward a desired portion of the enclosure 300 such as, for example, away from the face of the user, into a portion of the enclosure in which no components are installed, and the like. The shape of the first section 331, and the interface between a peripheral portion of the first section 331 and a corresponding peripheral portion of the second section 332 may inhibit the further spreading or dissipation of heat from the first section 331 into the second section 332, due to the thermal conductivity properties of the second section 332.

As with the lateral heat spreading in the arm portion 230 described above with respect to FIGS. 3A and 3B, a configuration of the first section 331 and the second section 332 of the intermediate layer 330 (i.e., a shape, a peripheral contour, a thickness and the like) provides for the lateral spreading of heat generated by the one or more components 250) installed in the interior space 385 of the enclosure 380, while inhibiting translational spreading of heat. For examples, the first and second sections 331, 332 of the intermediate layer 330 may be configured to draw heat generated by the one or more components away from the face of the user, and into portion of the enclosure 380 in which no components, or few components, are installed.

The relatively lower thermal conductivity properties of the second section 332 of the intermediate layer 330, and of the first and second layers 310, 320 compared to the intermediate layer 330, maintains the heat substantially in the first section 331 of the intermediate layer 330. This may maintain the outer surface of the second layer 320 (defining an outer surface of the front frame portion 220 of the example frame 210) at or below threshold touch temperatures, thus preserving user comfort in the use of the head mounted wearable device 100. This may also inhibit heat from entering the interior space 385 through the first layer 310, thus maintaining the interior space 385 within the enclosure 380 at or below threshold operating temperatures for the one or more components 250 installed in the interior space 385.

As noted above, in some examples, the first layer 310 and/or the second layer 320 may include a material having relatively low thermal conductivity properties. In some examples, the first layer 310 and/or the second layer 320 may provide insulating properties. In some examples, the first layer 310 and/or the second layer 320 may include a polycarbonate based material, a plastic based material, a resin based material, an epoxy based material, and other such materials that can have relatively low thermal conductivity properties and provide some level of insulating properties. In some examples, the first layer 310 and the second layer 310 are substantially the same material. In some examples, the first layer and the second layer 320 are different materials.

In some examples, at least a portion of the intermediate layer 330 includes a material having relatively high thermal conductivity properties. Such materials may include, for example, an aluminum based material, a copper based material, a graphite based material, and other materials that can provide for thermal conductivity within the layered stack of materials forming the enclosure 300. In some examples, at least a portion of the intermediate layer 330 includes a material having relatively low thermal conductivity properties. Such materials may include, for example, a polycarbonate based material, a plastic based material, a resin based material, an epoxy based material, and other such materials that can have relatively low thermal conductivity properties and provide some level of insulating properties. In some examples, the intermediate layer 330 includes multiple sections including at least one section (i.e., the first section 331) made of a material having relatively high thermal conductivity properties, and at least one section (i.e., the second section 332) made of a material having relatively low thermal conductivity properties.

The above thermal management strategies can be achieved by incorporating internal layers within composite or additive material enclosures that enable custom tuning of lateral (spreading) and normal (thru) thermal paths within enclosures (i.e., the enclosures 300, 380 described above, and other such enclosures) in which heat generating components are installed. When configured in this manner, smaller internal volumes (i.e., the interior spaces 350, 385) may accommodate the installation of heat generating components closer to external surfaces of the enclosures, while also balancing heat loads. The above thermal management strategies may provide increased thermal dissipating surface area of the devices in which they are installed, and flatten hot spots generated by the components installed therein, thereby increasing operating time (and in particular, continuous operating time), of high power experiences, and allowing for overall higher power experiences be executed by devices having smaller overall form factors. This is illustrated in the surface temperature plots shown in FIGS. 4A and 4B.

FIG. 4A(1) is a surface temperature plot of a first side, and FIG. 4A(2) is a surface temperature plot of a second side, of an example housing, or enclosure, such as the example housings, or enclosures 300, 380 described above, or other such enclosures, or housings, having heat generating components installed therein. In FIGS. 4A(1) and 4A(2), the enclosure is made of a stack of laminated materials including a plurality of plastic based layers. As shown in FIG. 4A(1), absent thermal mitigation strategies as described above, operation of the heat generating components produces a hot spot on an installation side of the enclosure having a peak temperature of approximately 114 degrees Celsius. In the example shown in FIGS. 4A(1) and 4A(2), the enclosure materials experience a temperature gradient of approximately 89 degrees Celsius.

FIG. 4B(1) is a surface temperature plot of a first side, and FIG. 4B(2) is a surface temperature plot of a second side, of an example enclosure as shown in FIG. 4B(3), such as the example enclosures 300, 380 described above, or other such enclosure, having heat generating components installed therein. In FIGS. 4B(1) and 4B(2), the enclosure is made of a stack of laminated materials including an inner layer and an outer layer formed of a plastic based material, and an intermediate layer between the inner and outer layers including of an aluminum material. In this example, the intermediate layer is incorporated substantially fully between mating surfaces of the first and second layers of the enclosure, as shown in FIG. 4B(3). As shown in FIG. 4B(1), with the incorporation of the embedded aluminum based layer as described above, operation of the heat generating components reduces the peak temperature of the hot spot on the installation side of the enclosure to approximately 42 degrees Celsius. In the example shown in FIGS. 4B(1)-4B(3), the addition of the intermediate layer including the aluminum material as shown lowers the temperature gradient to approximately 4 degrees Celsius.

FIG. 4C(1) is a surface temperature plot of a first side, and FIG. 4C(2) is a surface temperature plot of a second side, of an example enclosure as shown in FIG. 4C(3), such as the example enclosures 300, 380 described above, or other such enclosure, having heat generating components installed therein. In FIGS. 4C(1) and 4C(2), the enclosure is made of a stack of laminated materials including an inner layer and an outer layer formed of a plastic based material, and an intermediate layer between the inner and outer layers including an aluminum material. In particular, in this example, the intermediate layer is made of structured aluminum and plastic materials defining a thermal path in the areas of aluminum material placement. That is, in this example, the intermediate layer is contoured, or shaped, so as to direct the spreading or dissipation of heat in a desired direction in the enclosure, as shown in FIG. 4C(3). As shown in FIG. 4C(1), with the incorporation of an embedded aluminum structured layer as described above, operation of the heat generating components reduces the peak temperature of the hot spot on the installation side of the enclosure to approximately 54 degrees Celsius and allows for specific control of the heat dissipating surfaces. In the example shown in FIGS. 4C(1)-4C(3), the addition of the intermediate layer including the aluminum material as shown lowers the temperature gradient to approximately 27 degrees Celsius.

In a device such as the example head mounted wearable device 100 (and other such devices having a relatively small form factor), to maintain the desired, relatively small form factor, a typical overall thickness of an enclosure of the head mounted wearable device 100 (such as the example enclosures 300, 380, or other such enclosures) may be between approximately 6.0 mm and approximately 15 mm, with a typical wall thickness of between approximately 0.6 mm and 0.8 mm. Traditional material fabrication techniques do not provide for embedding the types of thermal management measures described above into the structure of these types of thin walled enclosures, while still providing the internal installation volume, and maintaining the desired, relatively small form factor.

In some examples, thermoforming techniques, or compression molding techniques, may be adapted to produce thin walled enclosures (such as the enclosure 300, 380 described above, or other such enclosures) including the example thermal management measures described above. That is, thermoforming techniques may be used to produce a bonded layered stack of materials including, for example, a plastic based thin film, a sheet of thermal material (for example, an aluminum sheet, a copper sheet, a graphite sheet, or other such material), and another plastic based thin film. The sheet of thermal material may be die cut, so that the shape and/or contour of the thermal material will provide the desired thermal path for heat dissipation, as described above. The layered films may be positioned on a mold, with heat and/or pressure and/or vacuum applied to the mold to form a bonded/laminated stack of materials having the thermal material embedded as an internal layer. The resulting bonded/laminated stack of materials may form a non-homogeneous thin walled enclosure. In some examples, additive manufacturing techniques may be adapted to produce thin walled enclosures (such as the enclosure 300, 380 described above, or other such enclosures) including the example thermal management measures described above. For example, additive manufacturing may be used to produce a thin thermal structure including the thermal material described above. The sintered metal matrix, in the form of, for example, a thermal layer, can be added to a laminar stack-up of materials including the plastic based layers to form the desired enclosure. The resulting laminar stack-up of materials may form a non-homogeneous thin walled enclosure. Additionally, the sintered metal matrix thermal structure may be inserted into an injection molding machine for over-molding or insert molding of plastic or other high flow material around the thermal layer to produce the non-homogeneous thin walled enclosure. These methods of manufacture may produce thin walled structures having the overall relatively small form factor desired for a head mounted wearable device in the form of smart glasses, or augmented reality glasses, while providing for thermal management/heat spreading and dissipation, and also preserving interior space/installation volume to accommodate components within the enclosures.

In the following, some examples are described.

Example 1: A wearable computing device may include a frame: and an enclosure formed by a portion of the frame, the enclosure defining an interior space. The enclosure may include a first layer defining an interior surface of the enclosure: a second layer defining an exterior surface of the enclosure: and an intermediate layer positioned between the first layer and the second layer. The intermediate layer may include a first section including a first material having thermal properties configured to spread heat generated by at least one heat generating component installed in the interior space in the enclosure: and a second section including a second material having thermal properties configured to inhibit further spreading of heat through the enclosure.

Example 2: The wearable computing device as in Example 1, wherein the wearable computing device is a head mounted wearable computing device. The frame may include a front frame portion: a first arm portion rotatably coupled to a first end portion of the front frame portion: and a second arm portion rotatably coupled to a second end portion of the front frame portion.

Example 3: The wearable computing device as in Example 2, wherein the enclosure is defined in at least one of the front frame portion, the first arm portion, or the second arm portion.

Example 4: The wearable computing device of any one of the preceding Examples, wherein the first layer may be a polycarbonate based material. The second layer may be a polycarbonate based material. The first section of the intermediate layer may be one of an aluminum material, a copper material, or a graphite material. The second section of the intermediate layer may be a polycarbonate based material. The material of each of the first layer, the second layer, the first section of the intermediate layer, and the second section of the intermediate layer can be realized separately from the material of the remaining three of the first layer, the second layer, the first section of the intermediate layer, and the second section of the intermediate layer.

Example 5: The wearable computing device of any one of the preceding Examples, wherein a coefficient of thermal conductivity of the first material of the first section of the intermediate layer is greater than a coefficient of thermal conductivity of the second material of the second section of the intermediate layer.

Example 6: The wearable computing device of any one of the preceding Examples, wherein the coefficient of thermal conductivity of the first material of the first section of the intermediate layer is greater than a coefficient of thermal conductivity of the first layer: and/or the coefficient of thermal conductivity of the first material of the first section of the intermediate layer is greater than a coefficient of thermal conductivity of the second layer.

Example 7: The wearable computing device of any one of the preceding Examples, wherein the enclosure includes a compression molded non-homogeneous thermally dissipative enclosure including a bonded layered stack of materials including the first layer, the second layer, and the intermediate layer.

Example 8: The wearable computing device of Example 7, wherein the first layer is a thin film plastic based layer: the intermediate layer is a contoured sheet of thermal material, the contoured sheet of thermal material defining a thermal path from the at least one heat generating component through the enclosure: and the second layer is a thin film plastic based layer.

Example 9): The wearable computing device of any one of Example 1 through Example 6, wherein the enclosure includes a sintered non-homogeneous thermally dissipative enclosure formed of a laminated stack of materials. The first layer may be plastic based layer. The intermediate layer may be a sintered metal matrix layer. The second layer may be a plastic based layer.

Example 10: The wearable computing device of any one of the preceding Examples, wherein a peripheral contour of the first section of the intermediate layer corresponds to a thermal path in the enclosure for spreading of heat generated by the at least one heat generating component.

Example 11: The wearable computing device of any one of the preceding Examples, wherein a peripheral contour of the second section of the intermediate layer is complementary to the peripheral contour of the second section of the intermediate layer, such that further spreading of heat is inhibited by a boundary between the first section and the second section.

Example 12: A head mounted wearable computing device may include a frame. The frame may include a front frame portion: and a pair of arm portions coupled to opposite end portions of the front frame portion. The head mounted wearable computing device may include an enclosure formed by at least one of the front frame portion or one of the pair of arm portions, the enclosure defining an interior space. The enclosure may include a first layer defining an interior surface of the enclosure: a second layer defining an exterior surface of the enclosure: and an intermediate layer positioned between the first layer and the second layer, the intermediate layer including a thermal layer. A shape of the thermal layer may define a thermal path for spreading of heat generated by at least one heat generating component installed in the interior space in the enclosure. A coefficient of thermal conductivity of the thermal layer may be greater than a coefficient of thermal conductivity of the first layer, and greater than a coefficient of thermal conductivity of the second layer, so as to inhibit translational spreading of heat from the thermal layer into the first layer and the second layer.

Example 13: The head mounted wearable device of Example 12, wherein the intermediate layer includes an insulating layer positioned laterally adjacent to the thermal layer, wherein the coefficient of thermal conductivity of the thermal layer is greater than a coefficient of thermal conductivity of the insulating layer, so as to inhibit lateral spreading of heat from the thermal layer into the insulating layer.

Example 14: The head mounted wearable computing device of Example 12 or Example 13, wherein a peripheral contour of the thermal layer corresponds to a thermal path in the enclosure for spreading of heat generated by the at least one heat generating component: and a peripheral contour of the insulating layer is complementary to the peripheral contour of the thermal layer, such that further spreading of heat is inhibited by a boundary between the thermal layer and the insulating layer.

Example 15: The head mounted wearable computing device of any one of Example 12 through Example 13, wherein the first layer may be a polycarbonate based material. The second layer may be a polycarbonate based material. The thermal layer of the intermediate layer may be one of an aluminum material, a copper material, or a graphite material. The insulating layer of the intermediate layer may be a polycarbonate based material. The material of each of the first layer, the second layer, the thermal layer of the intermediate layer, and the insulating of the intermediate layer can be realized separately from the material of the remaining three of the first layer, the second layer, the thermal layer of the intermediate layer, and the insulating layer of the intermediate layer.

Example 16: The head mounted wearable computing device of any one of Example 12 through Example 14, wherein the enclosure comprises a compression molded non-homogeneous thermally dissipative enclosure including a bonded layered stack of materials including the first layer, the second layer, and the intermediate layer. The first layer may be a thin film plastic based layer. The thermal layer may be a contoured sheet of thermal material, the contoured sheet of thermal material defining a thermal path from the at least one heat generating component through the enclosure. The second layer may be a thin film plastic based layer.

Example 17: The head mounted wearable computing device of Example 12, wherein the enclosure includes a sintered non-homogeneous thermally dissipative enclosure formed of a laminated stack of materials. The first layer may be plastic based layer. The thermal layer may be a sintered metal matrix layer. The second layer may be a plastic based layer.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a." "an," and "the" are intended to include the plural forms as well, unless the context clearly indicates otherwise. It will be further understood that the terms "comprises," "comprising." "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled." "directly connected," or "directly responsive" to, or "directly on," another element, there are no intervening elements present. As used herein the term "and/or" includes any and all combinations of one or more of the associated listed items.

Spatially relative terms, such as "beneath," "below;" "lower," "above." "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below: The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc, may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A wearable computing device, comprising:
    a frame; and
    an enclosure formed by a portion of the frame, the enclosure defining an interior space, the enclosure including:
    a first layer adjacent an interior of the enclosure;
    a second layer adjacent the first layer; and
    an intermediate layer positioned between the first layer and the second layer, the intermediate layer including:
        a first section including a first material having thermal properties configured to spread heat generated by at least one heat generating component installed in the interior space in the enclosure; and
        a second section including a second material having thermal properties configured to inhibit further spreading of heat through the enclosure.

2. The wearable computing device of claim 1, wherein the wearable computing device is a head mounted wearable computing device, and wherein the frame includes:
    a front frame portion;
    a first arm portion rotatably coupled to a first end portion of the front frame portion; and
    a second arm portion rotatably coupled to a second end portion of the front frame portion.

3. The wearable computing device of claim 2, wherein the enclosure is defined in at least one of the front frame portion, the first arm portion, or the second arm portion.

4. The wearable computing device of claim 1, wherein
    the first layer is a polycarbonate based material;
    the second layer is a polycarbonate based material;
    the first section of the intermediate layer is one of an aluminum material, a copper material, or a graphite material; and
    the second section of the intermediate layer is a polycarbonate based material.

5. The wearable computing device of claim 1, wherein a coefficient of thermal conductivity of the first material of the first section of the intermediate layer is greater than a coefficient of thermal conductivity of the second material of the second section of the intermediate layer.

6. The wearable computing device of claim 1, wherein at least one of:
    a coefficient of thermal conductivity of the first material of the first section of the intermediate layer is greater than a coefficient of thermal conductivity of a material of the first layer; or
    a coefficient of thermal conductivity of the first material of the first section of the intermediate layer is greater than a coefficient of thermal conductivity of a material of the second layer.

7. The wearable computing device of claim 1, wherein the enclosure comprises a compression molded non-homogeneous thermally dissipative enclosure including a bonded layered stack of materials including the first layer, the second layer, and the intermediate layer.

8. The wearable computing device of claim 7, wherein
    the first layer is a thin film plastic based layer;
    the intermediate layer is a contoured sheet of thermal material, the contoured sheet of thermal material defining a thermal path from the at least one heat generating component through the enclosure; and
    the second layer is a thin film plastic based layer.

9. The wearable computing device of claim 1, wherein the enclosure comprises a sintered non-homogeneous thermally dissipative enclosure formed of a laminated stack of materials, wherein:
    the first layer is plastic based layer;
    the intermediate layer is a sintered metal matrix layer; and
    the second layer is a plastic based layer.

10. The wearable computing device of claim 1, wherein a peripheral contour of the first section of the intermediate layer corresponds to a thermal path in the enclosure for spreading of heat generated by the at least one heat generating component.

11. The wearable computing device of claim 1, wherein a peripheral contour of the second section of the intermediate layer is complementary to the peripheral contour of the second section of the intermediate layer, such that further spreading of heat is inhibited by a boundary between the first section and the second section.

12. The wearable computing device of claim 1, wherein the first layer defines an interior surface of the enclosure and/or the second layer defines an exterior surface of the enclosure.

13. A head mounted wearable computing device, including:
an enclosure defining an interior space and including:
a first layer adjacent the interior space;
a second layer adjacent the first layer; and
an intermediate layer positioned between the first layer and the second layer, the intermediate layer including a thermal layer,
wherein a shape of the thermal layer defines a thermal path for spreading of heat generated by at least one heat generating component installed in the interior space in the enclosure, and
wherein a coefficient of thermal conductivity of the thermal layer is greater than a coefficient of thermal conductivity of the first layer, and the coefficient of thermal conductivity of the thermal layer is greater than a coefficient of thermal conductivity of the second layer.

14. The head mounted wearable computing device of claim 13, wherein the intermediate layer includes an insulating layer positioned laterally adjacent to the thermal layer, wherein a coefficient of thermal conductivity of the thermal layer is greater than a coefficient of thermal conductivity of the insulating layer.

15. The head mounted wearable computing device of claim 14, wherein
a peripheral contour of the thermal layer corresponds to a thermal path in the enclosure for spreading of heat generated by the at least one heat generating component; and
a peripheral contour of the insulating layer is complementary to the peripheral contour of the thermal layer, such that further spreading of heat is inhibited by a boundary between the thermal layer and the insulating layer.

16. The head mounted wearable computing device of claim 14, wherein
the first layer is a polycarbonate based material;
the second layer is a polycarbonate based material;
the thermal layer of the intermediate layer is one of an aluminum material, a copper material, or a graphite material; and
the insulating layer of the intermediate layer is a polycarbonate based material.

17. The head mounted wearable computing device of claim 13, wherein the enclosure comprises a compression molded non-homogeneous thermally dissipative enclosure including a bonded layered stack of materials including the first layer, the second layer, and the intermediate layer, wherein:
the first layer is a thin film plastic based layer;
the thermal layer is a contoured sheet of thermal material, the contoured sheet of thermal material defining a thermal path from the at least one heat generating component through the enclosure; and
the second layer is a thin film plastic based layer.

18. The head mounted wearable computing device of claim 13, wherein the enclosure comprises a sintered non-homogeneous thermally dissipative enclosure formed of a laminated stack of materials, wherein:
the first layer is plastic based layer;
the thermal layer is a sintered metal matrix layer; and
the second layer is a plastic based layer.

19. The head mounted wearable computing device of claim 13, wherein the first layer defines an interior surface of the enclosure and/or the second layer defines an exterior surface of the enclosure.

20. A wearable device, comprising:
a frame defining a structure of the wearable device; and
an enclosure formed by a portion of the frame, the enclosure defining an interior space, the enclosure including:
a first layer adjacent an interior of the enclosure;
a second layer adjacent the first layer;
a thermal layer positioned between the first layer and the second layer, wherein a contour of the thermal layer defines a thermal path for spreading of heat generated by at least one heat generating component installed in the interior space in the enclosure; and
an insulating layer positioned between the first layer and the second layer, wherein a contour of the insulating layer is complementary to the contour of the thermal layer, such that further spreading of heat is inhibited by a boundary between the thermal layer and the insulating layer.

21. The wearable device of claim 20, wherein:
a coefficient of thermal conductivity of the thermal layer is greater than a coefficient of thermal conductivity of the first layer, and
the coefficient of thermal conductivity of the thermal layer is greater than a coefficient of thermal conductivity of the second layer.

22. The wearable device of claim 20, wherein the first layer defines an interior surface of the enclosure and/or the second layer defines an exterior surface of the enclosure.

* * * * *